US008386140B2

(12) United States Patent  
Tsuda et al.

(10) Patent No.: US 8,386,140 B2  
(45) Date of Patent: Feb. 26, 2013

(54) HYBRID VEHICLE CONTROL DEVICE TO CONTROL TRANSMISSION TORQUE INPUT

(75) Inventors: Kohei Tsuda, Nishio (JP); Yoichi Tajima, Anjo (JP); Yomei Hakumura, Toyokawa (JP); Hiroaki Kioka, Nisio (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 13/350,151

(22) Filed: Jan. 13, 2012

(65) Prior Publication Data

US 2012/0232732 A1    Sep. 13, 2012

(30) Foreign Application Priority Data

Mar. 9, 2011 (JP) ................................. 2011-052012

(51) Int. Cl.
| | |
|---|---|
| *B60F 11/00* | (2006.01) |
| *B60K 6/20* | (2007.10) |
| *B60W 10/06* | (2006.01) |
| *B60W 10/08* | (2006.01) |
| *B60W 20/00* | (2006.01) |
| *G06F 17/00* | (2006.01) |

(52) U.S. Cl. ................ 701/60; 701/22; 701/51; 701/54; 701/84; 180/65.21; 180/65.28; 180/65.285

(58) Field of Classification Search .................... 701/22, 701/54, 60, 87, 51, 84; 180/65.21, 65.28, 180/65.285

See application file for complete search history.

(56) References Cited

U.S. PATENT DOCUMENTS

| | | | |
|---|---|---|---|
| 5,951,614 A | | 9/1999 | Tabata et al. |
| 6,971,968 B2 * | | 12/2005 | Imazu et al. ...................... 477/2 |
| 2006/0196711 A1 | | 9/2006 | Endo |
| 2010/0262323 A1 * | | 10/2010 | Tanba et al. ..................... 701/22 |
| 2012/0059538 A1 * | | 3/2012 | Morris ............................. 701/22 |

FOREIGN PATENT DOCUMENTS

| | | |
|---|---|---|
| JP | A-09-331602 | 12/1997 |
| JP | A-2005-273761 | 10/2005 |

OTHER PUBLICATIONS

Mar. 13, 2012 International Search Report issued in International Patent Application No. PCT/JP2012/053144 (with translation).

* cited by examiner

*Primary Examiner* — Fadey Jabr  
*Assistant Examiner* — Thomas Ingram  
(74) *Attorney, Agent, or Firm* — Oliff & Berridge, PLC

(57) ABSTRACT

A control device controls an input coupled to a drive force source including a rotary electric machine and an internal combustion engine, an output coupled to wheels, and a speed change mechanism that transfers rotation of the input to the output with a speed of the rotation changed in accordance with a speed ratio of a shift speed selected from a plurality of shift speeds. When switching between the shift speeds, a rotation-varying torque value is calculated, the rotary electric machine outputs torque based on the rotation-varying torque value, and when an absolute value of the torque that the rotary electric machine outputs will become more than a predetermined threshold, both the rotary electric machine and the internal combustion engine are caused to output torque corresponding to the rotation-varying torque value such that the output torque of the rotary electric machine becomes equal to or less than the predetermined threshold.

13 Claims, 9 Drawing Sheets

HYBRID VEHICLE CONTROL DEVICE TO CONTROL TRANSMISSION TORQUE INPUT

INCORPORATION BY REFERENCE

The disclosure of Japanese Patent Application No. 2011-052012 filed on Mar. 9, 2011 including the specification, drawings and abstract is incorporated herein by reference in its entirety.

BACKGROUND OF THE INVENTION

The present invention relates to a control device that controls a vehicle drive device including an input member drivably coupled to a drive force source including a rotary electric machine and an internal combustion engine, an output member drivably coupled to wheels, and a speed change mechanism that transfers rotation of the input member to the output member with the rotational speed changed in accordance with the speed ratio of a shift speed selected from a plurality of shift speeds that can be established switchably.

DESCRIPTION OF THE RELATED ART

A device described in Japanese Patent Application Publication No. JP-A-09-331602 mentioned below, for example, is known as a drive device for a hybrid vehicle including an internal combustion engine and a rotary electric machine each serving as a drive force source. In the technique according to JP-A-09-331602, when switching between shift speeds of a speed change mechanism, the rotational speed of an input member is varied using the rotary electric machine to switch between shift speeds if the rotary electric machine can be caused to output torque for varying the rotational speed of the input member, and the rotational speed of the input member is varied using the internal combustion engine to switch between shift speeds if the rotary electric machine cannot be caused to output torque for varying the rotational speed of the input member.

However, the technique according to JP-A-09-331602 causes either one of the rotary electric machine and the internal combustion engine to output torque for varying the rotational speed of the input member, and is not capable of causing both the rotary electric machine and the internal combustion engine to output torque for varying the rotational speed of the input member. Accordingly, when switching between shift speeds, the technique according to JP-A-09-331602 is not capable of appropriately utilizing the respective characteristics of the rotary electric machine and the internal combustion engine through coordination between the rotary electric machine and the internal combustion engine, or causing both the rotary electric machine and the internal combustion engine to output torque to speed up variations in rotational speed of the input member.

SUMMARY OF THE INVENTION

In view of the foregoing, there has been desired a control device that can cause both a rotary electric machine and an internal combustion engine to output torque for varying the rotational speed of an input member when switching between shift speeds of a speed change mechanism.

According to a first aspect of the present invention, a control device controls a vehicle drive device including an input member drivably coupled to a drive force source including a rotary electric machine and an internal combustion engine, an output member drivably coupled to wheels, and a speed change mechanism that transfers rotation of the input member to the output member with a speed of the rotation changed in accordance with a speed ratio of a shift speed selected from a plurality of shift speeds that can be established switchably. In the control device, when switching between the shift speeds, a rotation-varying torque command value, which is a command value for torque that the drive force source is caused to output to vary the rotational speed of the input member, is calculated, the rotary electric machine is caused to output torque in accordance with the rotation-varying torque command value, and in the case where it is determined that an absolute value of the torque that the rotary electric machine is caused to output will become more than a predetermined threshold, both the rotary electric machine and the internal combustion engine are caused to output torque corresponding to the rotation-varying torque command value such that the output torque of the rotary electric machine becomes equal to or less than the predetermined threshold.

The term "rotary electric machine" is used herein as a concept including any of a motor (electric motor), a generator (electric generator), and a motor generator that functions both as a motor and as a generator as necessary.

Also, the term "drivably coupled" is used herein as a concept including a state in which two rotary elements are coupled to each other in such a way that allows transfer of a drive force, which includes a state in which the two rotary elements are coupled to each other to rotate together with each other, and a state in which the two rotary elements are coupled to each other via one or two or more transmission members in such a way that allows transfer of a drive force. Examples of such transmission members include various members that transfer rotation at an equal speed or a changed speed, such as a shaft, a gear mechanism, a belt, and a chain. Additional examples of such transmission members include engagement elements that selectively transfer rotation and a drive force, such as a friction clutch and a meshing type clutch.

According to the first aspect, when switching between shift speeds, the rotary electric machine can be caused to output torque corresponding to the rotation-varying torque command value, and in the case where it is determined that the absolute value of the torque that the rotary electric machine is caused to output will become more than the predetermined threshold, both the rotary electric machine and the internal combustion engine can be caused to output torque corresponding to the rotation-varying torque command value.

Accordingly, the rotary electric machine, which is highly responsive and accurate compared to the internal combustion engine, can be caused to output torque corresponding to the rotation-varying torque command value in priority. Thus, it is possible to improve the control accuracy and the responsiveness of variations in rotational speed of the input member when switching between shift speeds. As a result, it is possible to suppress occurrence of a torque shock and to improve the responsiveness of variations in rotational speed of the input member when switching between shift speeds.

In the case where it is determined that the absolute value of the torque that the rotary electric machine is caused to output will become more than the predetermined threshold, not only the rotary electric machine but also the internal combustion engine is caused to output torque corresponding to the rotation-varying torque command value. Thus, it is possible to speed up variations in rotational speed of the input member by using both torque from the rotary electric machine and torque from the internal combustion engine in combination when switching between shift speeds.

According to a second aspect of the present invention, at least a feedback command value that varies the rotation-varying torque command value in a feedback manner such that the rotational speed of the input member follows target rotational speed variation may be able to be calculated as the rotation-varying torque command value, and the feedback command value for the rotary electric machine may be calculated in priority to the feedback command value for the internal combustion engine.

According to the second aspect, the feedback command value for the rotary electric machine, which outputs torque with relatively high responsiveness and accuracy, is calculated in priority to the feedback command value for the internal combustion engine. Thus, feedback control can be performed with high responsiveness and accuracy. Accordingly, even in the case where the rotational speed of the input member fluctuates from the target rotational speed variation because of fluctuations in characteristics of the vehicle drive device or disturbance factors such as control errors of the control device, the rotational speed of the input member can be robustly maintained at the target rotational speed variation through feedback control that uses the rotary electric machine.

According to a third aspect of the present invention, a feedforward command value that varies the rotation-varying torque command value in a feedforward manner and a feedback command value that varies the rotation-varying torque command value in a feedback manner such that the rotational speed of the input member follows target rotational speed variation may be able to be calculated as the rotation-varying torque command value, when decreasing an absolute value of the rotation-varying torque command value, an absolute value of the feedforward command value for the rotary electric machine may be decreased in priority to an absolute value of the feedforward command value for the internal combustion engine, and the feedback command value for the rotary electric machine may be calculated in priority to the feedback command value for the internal combustion engine after the absolute value of the feedforward command value for the rotary electric machine starts decreasing.

According to the third aspect, when decreasing the absolute value of the rotation-varying torque command value, the absolute value of the feedforward command value for the rotary electric machine is decreased in priority to the absolute value of the feedforward command value for the internal combustion engine. Thus, a margin allowing the rotary electric machine to output torque corresponding to the feedback command value can be secured immediately after the absolute value of the rotation-varying torque command value starts decreasing. Accordingly, the rotational speed of the input member can be robustly maintained at the target rotational speed variation through feedback control that uses the rotary electric machine immediately after the absolute value of the rotation-varying torque command value starts decreasing.

In the case where the absolute value of the rotation-varying torque command value is decreased when the rotational speed of the input member has approximated the rotational speed after switching between shift speeds, rotation-varying torque transferred to the input member can be decreased accurately through feedback control that uses the rotary electric machine. Accordingly, variations in rotational speed of the input member can be accurately approximated to variations in rotational speed after switching between shift speeds when the rotational speed of the input member has reached the rotational speed after switching between shift speeds. Thus, it is possible to suppress occurrence of a torque shock when switching between shift speeds.

According to a fourth aspect of the present invention, the feedback command value for the rotary electric machine may be calculated in priority to the feedback command value for the internal combustion engine after an absolute value of the feedforward command value for the rotary electric machine is decreased to zero.

According to the fourth aspect, the feedback command value for the rotary electric machine is calculated after the absolute value of the feedforward command value for the rotary electric machine is decreased to zero. Accordingly, the width of variations in rotation-varying torque command value caused by the rotary electric machine for feedback control can be balanced well in both the positive direction and the negative direction. Therefore, the feedback command value can be increased in the positive direction or the negative direction to improve the response time of the feedback control, or can be adapted to disturbance in both the positive direction and the negative direction in a well-balanced manner.

According to a fifth aspect of the present invention, all the feedforward command value in the rotation-varying torque command value may be calculated as the feedforward command value for the internal combustion engine and all the feedback command value in the rotation-varying torque command value may be calculated as the feedback command value for the rotary electric machine after an absolute value of the feedforward command value for the rotary electric machine is decreased to zero.

According to the fifth aspect, the internal combustion engine is caused to output torque corresponding to all the feedforward command value and the rotary electric machine is caused to output torque corresponding to all the feedback command value after the absolute value of the feedforward command value for the rotary electric machine is decreased to zero. Accordingly, torque corresponding to the rotation-varying torque command value can be output through role sharing between the internal combustion engine and the rotary electric machine. That is, the internal combustion engine, which outputs torque with relatively low responsiveness and accuracy, is caused to output torque for causing the rotational speed of the input member to roughly follow the target rotational speed variations in a feedforward manner, and the rotary electric machine, which outputs torque with relatively high responsiveness and accuracy, is caused to output torque for causing the rotational speed of the input member to accurately follow the target rotational speed variations in a feedback manner. Thus, it is possible to perform control that appropriately utilizes both the characteristics of the internal combustion engine and the characteristics of the rotary electric machine.

According to a sixth aspect of the present invention, at least a feedforward command value that varies the rotation-varying torque command value in a feedforward manner may be able to be calculated as the rotation-varying torque command value, and an absolute value of the feedforward command value for the rotary electric machine may be increased, within a range in which the output torque of the rotary electric machine is equal to or less than the predetermined threshold, in priority to an absolute value of the feedforward command value for the internal combustion engine before an absolute value of the rotation-varying torque command value starts decreasing.

According to the sixth aspect, the rotary electric machine, which outputs torque with high responsiveness and accuracy compared to the internal combustion engine, can be caused to output torque corresponding to the feedforward command value in priority. Thus, it is possible to improve the control accuracy and the responsiveness of variations in rotational speed of the input member when varying the rotational speed of the input member.

According to a seventh aspect of the present invention, in the case where it is determined that an absolute value of torque that the rotary electric machine is caused to output in accordance with the rotation-varying torque command value will become more than the predetermined threshold, the internal combustion engine may be caused to output an amount of torque by which the predetermined threshold is exceeded.

According to the seventh aspect, the internal combustion engine is caused to output an amount of torque by which the predetermined threshold is exceeded. Thus, it is possible to make the absolute value of the torque that the rotary electric machine is caused to output less likely to become more than the predetermined threshold, and to cause both the rotary electric machine and the internal combustion engine to output torque corresponding to the rotation-varying torque command value.

DETAILED DESCRIPTION OF THE EMBODIMENTS

First Embodiment

Figure 1:
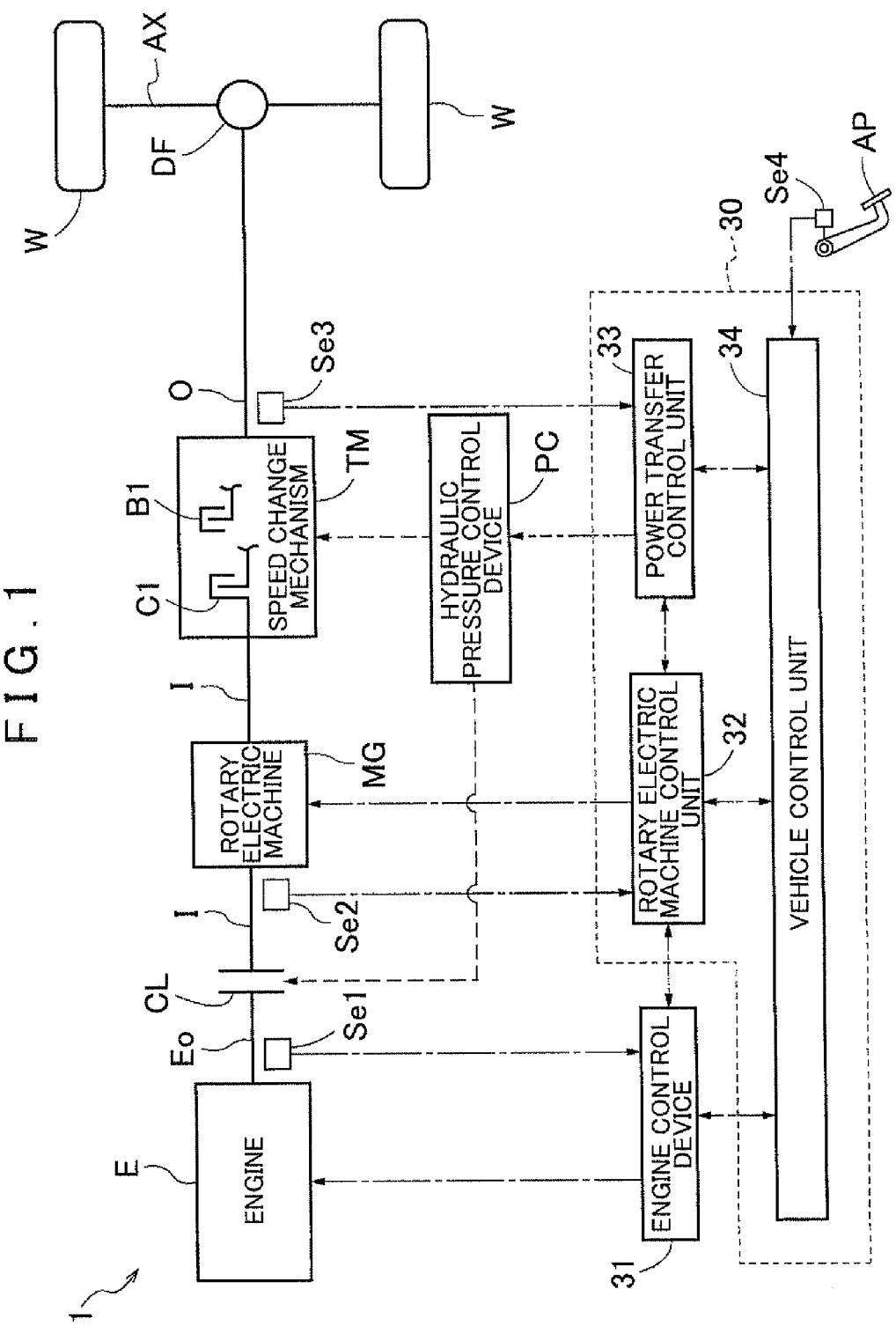
FIG. 1 is a schematic diagram showing a schematic configuration of a vehicle drive device and a control device according to an embodiment of the present invention.

A control device 30 according to an embodiment of the present invention will be described with reference to the drawings. FIG. 1 is a schematic diagram showing a schematic configuration of a vehicle drive device 1 according to the embodiment. As shown in the drawing, a vehicle incorporating the vehicle drive device 1 is a hybrid vehicle including an engine E, which is an internal combustion engine, and a rotary electric machine MG each serving as a drive force source for the vehicle. In the drawing, the solid lines each indicate a drive force transfer path, the broken lines each indicate a working oil supply path, and the dash-dotted lines each indicate a signal transfer path. In the embodiment, the control device 30 is a device that controls the vehicle drive device 1 including an input shaft I drivably coupled to a drive force source including the rotary electric machine MG and the engine E, an output shaft O drivably coupled to wheels W, and a speed change mechanism TM that transfers rotation of the input shaft I to the output shaft O with a rotational speed Ni changed in accordance with the speed ratio of a shift speed selected from a plurality of shift speeds that can be established switchably. In the embodiment, the engine E is drivably coupled to the input shaft I via an engine separation clutch CL. The input shaft I may function as the "input member" according to the present invention, and the output shaft O may function as the "output member" according to the present invention.

The control device 30 includes a rotary electric machine control unit 32 that controls the rotary electric machine MG a power transfer control unit 33 that controls the speed change mechanism TM and the engine separation clutch CL, and a vehicle control unit 34 that integrates these control devices to control the vehicle drive device 1. The hybrid vehicle also includes an engine control device 31 that controls the engine E.

Figure 2:
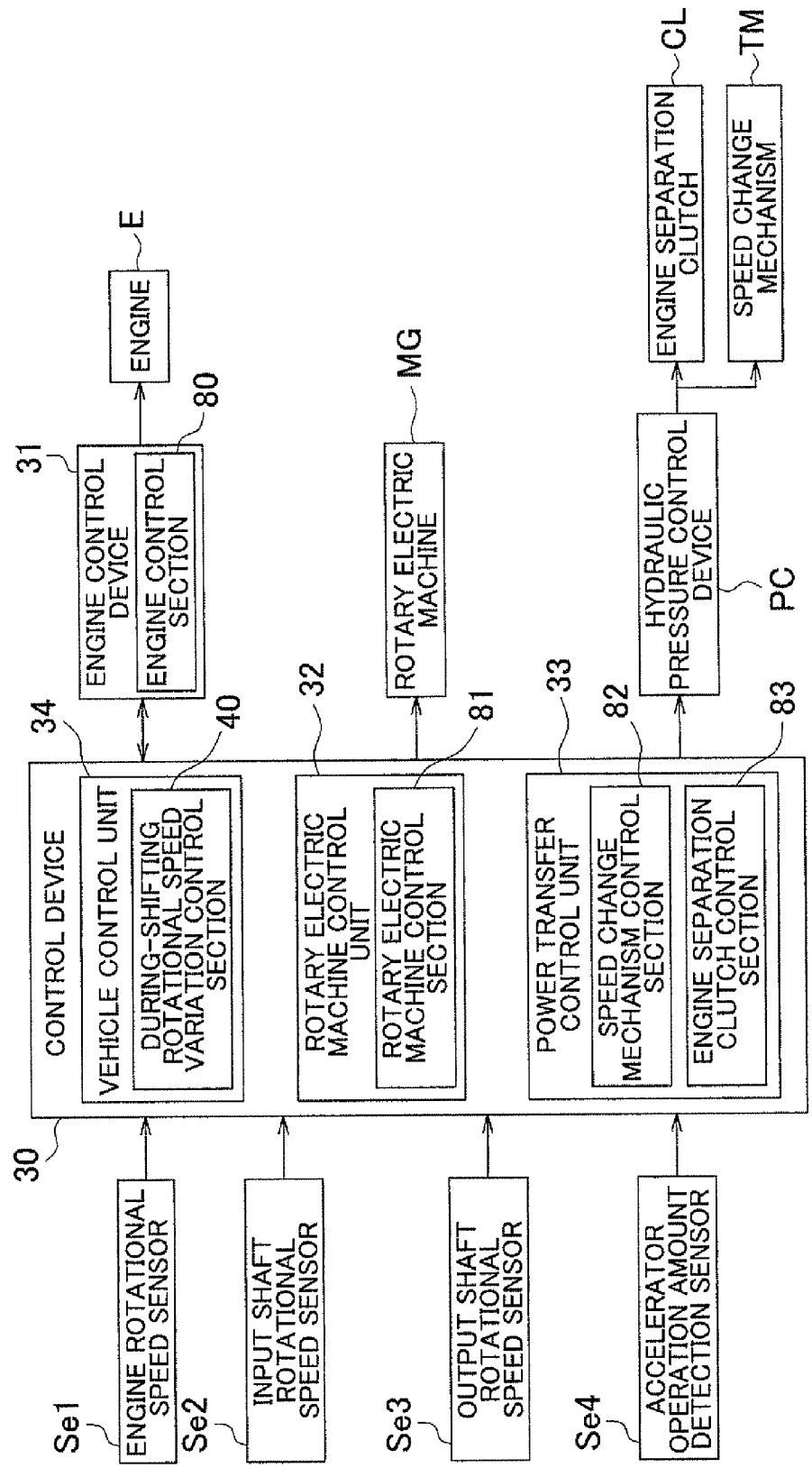
FIG. 2 is a block diagram showing a schematic configuration of the control device according to the embodiment of the present invention.

As shown in FIG. 2, the thus configured control device 30 according to the embodiment includes a during-shifting rotational speed variation control section 40. When switching between shift speeds of the speed change mechanism TM, the during-shifting rotational speed variation control section 40 calculates a rotation-varying torque command value Ta, which is a command value for torque that the drive force source is caused to output to vary the rotational speed Ni of the input shaft I, causes the rotary electric machine MG to output torque in accordance with the rotation-varying torque command value Ta, and in the case where it is determined that the absolute value of the torque that the rotary electric machine MG is caused to output will become more than a predetermined threshold, executes during-shifting rotational speed variation control by causing both the rotary electric machine MG and the engine E to output torque corresponding to the rotation-varying torque command value Ta such that the output torque of the rotary electric machine MG becomes equal to or less than the predetermined threshold. The vehicle drive device 1 and the control device 30 according to the embodiment will be described in detail below.

1. Configuration of Vehicle Drive Device

First, the configuration of the vehicle drive device 1 of the hybrid vehicle according to the embodiment will be described. As shown in FIG. 1, the hybrid vehicle is a parallel-type hybrid vehicle which includes the engine E and the rotary electric machine MG each serving as a drive force source for the vehicle, and in which the engine E and the rotary electric machine MG are drivably coupled to each other in series. The hybrid vehicle includes the speed change mechanism TM, which transfers rotation of the engine E and the rotary electric machine MG transferred to the input shaft I to the output shaft O with the rotational speed changed and torque converted.

The engine E is an internal combustion engine driven by combustion of fuel. Various engines known in the art such as a gasoline engine and a diesel engine, for example, may be used as the engine E. In the example, an engine output shaft Eo such as a crankshaft of the engine E is selectively drivably coupled via the engine separation clutch CL to the input shaft I drivably coupled to the rotary electric machine MG. That is, the engine E is selectively drivably coupled to the rotary electric machine MG via the engine separation clutch CL which is a friction engagement element. The engine output shaft Eo is drivably coupled to an engagement member of the engine separation clutch CL via a damper (not shown).

The rotary electric machine MG includes a stator that is fixed to a non-rotary member and a rotor that is rotatably supported radially inwardly of the stator. The rotor of the rotary electric machine MG is drivably coupled to the input shaft I so as to rotate together with the input shaft I. That is, in the embodiment, both the engine E and the rotary electric machine MG are drivably coupled to the input shaft I. The rotary electric machine MG is electrically connected to a battery serving as an electricity accumulation device via an inverter that performs a DC/AC conversion. The rotary electric machine MG can function as a motor (electric motor) that is supplied with electric power to produce power and as a generator (electric generator) that is supplied with power to generate electric power. That is, the rotary electric machine MG performs power running using electric power supplied from the battery via the inverter, or generates electric power using a rotational drive force transferred from the engine E or the wheels W to accumulate the generated electric power in the battery via the inverter. The battery is an example of the electricity accumulation device. Other types of electricity accumulation devices such as a capacitor may be used, or a plurality of types of electricity accumulation devices may be used in combination. In the following description, electric power generation performed by the rotary electric machine MG is referred to as "regeneration", and negative torque output from the rotary electric machine MG during electric power generation is referred to as "regenerative torque". In the case where target output torque for the rotary electric machine MG is negative torque, the rotary electric machine MG outputs regenerative torque while generating electric power using a rotational drive force transferred from the engine E or the wheels W. In the following description, in addition, positive torque output from the rotary electric machine MG functioning as an electric motor is referred to as "electric torque".

In the case where the rotary electric machine MG functions as an electric motor to output electric torque which is positive torque, there is an upper limit value for output torque (electric torque) that can be output from the rotary electric machine MG. In the case where the rotary electric machine MG functions as an electric generator to output regenerative torque which is negative torque, meanwhile, there is a lower limit value for output torque (regenerative torque) that can be output from the rotary electric machine MG. The upper limit value and the lower limit value vary in accordance with the rotational speed of the rotary electric machine MG. The upper limit value and the lower limit value also vary in accordance with the charge amount of the electricity accumulation device.

The speed change mechanism TM is drivably coupled to the input shaft I, to which the drive force source is drivably coupled. In the embodiment, the speed change mechanism TM is a stepped automatic transmission that provides a plurality of shift speeds with different speed ratios. In order to establish the plurality of shift speeds, the speed change mechanism TM includes a gear mechanism such as a planetary gear mechanism and a plurality of friction engagement elements B1, C1, . . . . The speed change mechanism TM transfers rotation of the input shaft I to the output shaft O with the rotational speed Ni changed with the speed ratio of each shift speed and torque converted. The torque transferred from the speed change mechanism TM to the output shaft O is distributed and transferred to two, left and right, axles AX via an output differential gear device DF to be transferred to the wheels W drivably coupled to the axles AX. Here, the term "speed ratio" refers to the ratio of the rotational speed Ni of the input shaft I to the rotational speed of the output shaft O in the case where each shift speed is established in the speed change mechanism TM. The term "speed ratio" as used herein refers to a value obtained by dividing the rotational speed Ni of the input shaft I by the rotational speed of the output shaft O. That is, the rotational speed of the output shaft O is obtained by dividing the rotational speed Ni of the input shaft I by the speed ratio. In addition, the torque transferred from the speed change mechanism TM to the output shaft O is obtained by multiplying torque transferred from the input shaft I to the speed change mechanism TM by the speed ratio.

In the example, the plurality of friction engagement elements B1, C1, and the engine separation clutch CL are each an engagement element such as a clutch and a brake formed to include friction members. The transfer torque capacity of each of the friction engagement elements CL, B1, C1, . . . can be continuously controlled so as to increase and decrease by controlling the engagement pressure of the friction engagement element by controlling the supplied hydraulic pressure. A wet multi-plate clutch and a wet multi-plate brake, for example, may be suitably used as the friction engagement elements.

A friction engagement element transfers torque between engagement members of the friction engagement element through friction between the engagement members. In the case where there is a difference in rotational speed (slipping) between the engagement members of the friction engagement element, torque (slip torque) corresponding to the magnitude of the transfer torque capacity is transferred from a member with a higher rotational speed to a member with a lower rotational speed through dynamic friction. In the case where there is no difference in rotational speed (slipping) between the engagement members of the friction engagement element, torque up to the magnitude of the transfer torque capacity is transferred between the engagement members of the friction engagement element through static friction. Here, the term "transfer torque capacity" refers to the magnitude of maximum torque that can be transferred by a friction engagement element through friction. The magnitude of the transfer torque capacity varies in proportion to the engagement pressure of the friction engagement element. The term "engagement pressure" refers to a pressure that presses an input-side engagement member (friction plate) and an output-side engagement member (friction plate) against each other. In the embodiment, the engagement pressure varies in proportion to the magnitude of the supplied hydraulic pressure. That is, in the embodiment, the magnitude of the transfer torque capacity varies roughly in proportion to the magnitude of the hydraulic pressure supplied to the friction engagement element.

Each of the friction engagement elements includes a return spring, and is urged to be disengaged by the reaction force of the spring. When a force produced by the hydraulic pressure supplied to a hydraulic cylinder of the friction engagement element exceeds the reaction force of the spring, the friction engagement element starts producing the transfer torque capacity to bring the friction engagement element from the disengaged state into the engaged state. The hydraulic pressure at which the transfer torque capacity starts being produced is referred to as a "stroke end pressure". Each of the friction engagement elements is configured such that the transfer torque capacity of the friction engagement element increases in proportion to an increase in supplied hydraulic pressure after the hydraulic pressure exceeds the stroke end pressure.

In the embodiment, the term "engaged state" refers to a state in which a friction engagement element is producing a transfer torque capacity. The term "disengaged state" refers to a state in which a friction engagement element is not producing a transfer torque capacity. The term "slipping engagement state" refers to an engaged state in which there is a difference in rotational speed (slipping) between engagement members of a friction engagement element. The term "direct engagement state" refers to an engaged state in which there is no difference in rotational speed (slipping) between engagement members of a friction engagement element. The term "non-direct engagement state" refers to an engagement state other than the direct engagement state, and includes the disengaged state and the slipping engagement state.

2. Configuration of Hydraulic Pressure Control System

Next, a hydraulic pressure control system of the vehicle drive device 1 will be described. The hydraulic pressure control system includes a hydraulic pressure control device PC that adjusts the hydraulic pressure of working oil supplied from a mechanical or electric hydraulic pump to a predetermined pressure. Although not described in detail here, the hydraulic pressure control device PC adjusts the degree of opening of one or two or more adjustment valves on the basis of a signal input from a linear solenoid valve for hydraulic pressure adjustment to adjust the amount of the working oil drained from the adjustment valves, thereby adjusting the hydraulic pressure of the working oil to one or two or more predetermined pressures. After being adjusted to the predetermined pressure, the working oil is supplied to each of the friction engagement elements such as those of the speed change mechanism TM and the engine separation clutch CL at a hydraulic pressure required by the friction engagement element.

3. Configuration of Control Device

Next, the configuration of the control device 30 which controls the vehicle drive device 1 will be described. In the embodiment, as shown in FIGS. 1 and 2, the control device 30 includes the rotary electric machine control unit 32 which controls the rotary electric machine MG, the power transfer control unit 33 which controls the speed change mechanism TM and the engine separation clutch CL, and the vehicle control unit 34 which integrates these control devices to control the vehicle drive device 1. In addition, the control device 30 is connected to the engine control device 31 which controls the engine E so as to communicate with the engine control device 31.

The control units 32 to 34 of the control device 30 and the engine control device 31 each include an arithmetic processing unit such as a CPU serving as a core member, a storage device such as a RAM (random access memory) configured to read and write data from and into the arithmetic processing unit and a ROM (read only memory) configured to read data from the arithmetic processing unit, and so forth. Functional sections 40 to 42 of the control device 3 and so forth are formed by software (a program) stored in the ROM of the control device or the like, hardware such as a separately provided arithmetic circuit, or a combination of both. The control units 32 to 34 of the control device 3 and the engine control device 31 are configured to communicate with each other, and perform cooperative control while sharing various information such as information detected by sensors and control parameters, thereby implementing functions of the functional sections 40 to 42.

The vehicle drive device 1 includes sensors Se1 to Se4 that output an electrical signal to be input to the control device 30. The control device 30 calculates information detected by the various sensors on the basis of the input electrical signal. An engine rotational speed sensor Se1 is a sensor that detects the rotational speed of the engine output shaft Eo (engine E). The control device 30 detects the rotational speed of the engine E on the basis of a signal input from the engine rotational speed sensor Se1. An input shaft rotational speed sensor Se2 is a sensor that detects the rotational speed Ni of the input shaft I. The rotor of the rotary electric machine MG is integrally drivably coupled to the input shaft I. Thus, the control device 30 detects the rotational speed of the input shaft I and the rotary electric machine MG on the basis of a signal input from the input shaft rotational speed sensor Set. An output shaft rotational speed sensor Se3 is a sensor that detects the rotational speed of the output shaft O. The control device 30 detects the rotational speed of the output shaft O on the basis of a signal input from the output shaft rotational speed sensor Se3. The rotational speed of the output shaft O is proportional to the vehicle speed. Therefore, the control device 30 calculates the vehicle speed on the basis of the signal input from the output shaft rotational speed sensor Se3. An accelerator operation amount detection sensor Se4 is a sensor that detects the amount of operation of an accelerator pedal AP operated by a driver to detect the accelerator operation amount. The control device 30 detects the acceleration operation amount on the basis of a signal input from the acceleration operation amount sensor Se4.

3-1. Engine Control Device

The engine control device 31 includes an engine control section 80. The engine control section 80 is a functional section that controls an operation of the engine E. In the embodiment, in the case where a command for target output torque for the engine E is provided from the vehicle control unit 34, the engine control section 80 performs torque control by setting a torque command value to the target output torque according to the command provided from the vehicle control unit 34 and controlling the engine E so as to output torque corresponding to the torque command value. In the case where the target output torque for the engine E is negative torque, the engine control device 31 may stop supply of fuel, or control the engine E so as to output negative torque by decreasing the throttle opening to increase the magnitude of pump torque, as necessary.

3-2. Rotary Electric Machine Control Unit

The rotary electric machine control unit 32 includes a rotary electric machine control section 81. The rotary electric machine control section 81 is a functional section that controls an operation of the rotary electric machine MG. In the embodiment, in the case where a command for target output torque for the rotary electric machine MG is provided from the vehicle control unit 34, the rotary electric machine control section 81 sets a torque command value to the rotary electric machine target output torque, and controls the rotary electric machine MG so as to output torque corresponding to the torque command value.

The rotary electric machine MG basically rotates in the forward direction. Therefore, in the case where the torque command value is set to be negative, the rotary electric machine MG generates electric power. That is, the rotary electric machine MG generates electric power by outputting regenerative torque in the negative direction while rotating in the positive direction. In the case where the torque command value is set to be positive, on the other hand, the rotary electric machine MG performs power running.

3-3. Power Transfer Control Unit

The power transfer control unit 33 is a control unit that that controls the speed change mechanism TM and the engine separation clutch CL. The power transfer control unit 33 receives information detected by the sensors such as the input shaft rotational speed sensor Se1 and the output shaft rotational speed sensor Se3. The power transfer control unit 33 includes a speed change mechanism control section 82 and an engine separation clutch control section 83.

3-3-1. Speed Change Mechanism Control Section

The speed change mechanism control section 82 is a functional section that controls the speed change mechanism TM. The speed change mechanism control section 82 determines a target shift speed for the speed change mechanism TM on the basis of information detected by the sensors such as the vehicle speed, the acceleration operation amount, and the shift position. Then, the speed change mechanism control section 82 controls the hydraulic pressure to be supplied to the friction engagement elements C1, B1, . . . provided in the speed change mechanism TM via the hydraulic pressure control device PC shown in FIG. 1 to engage and disengage the friction engagement elements in order to establish the target shift speed in the speed change mechanism TM.

Specifically, the speed change mechanism control section 82 provides the hydraulic pressure control device PC with a command for a target hydraulic pressure (command pressure) for the friction engagement elements B1, C1, . . . , and the hydraulic pressure control device PC supplies the friction engagement elements with a hydraulic pressure corresponding to the target hydraulic pressure (command pressure) according to the command.

The speed change mechanism control section 82 references a speed change map stored in a memory (not shown) to determine the target shift speed. The speed change map is a map defining the relationship between the accelerator operation amount and the vehicle speed, and the target shift speed for the speed change mechanism TM. The speed change map includes a plurality of upshift lines and a plurality of downshift lines. When the vehicle speed and the accelerator operation amount are varied so that an upshift line or a downshift line is crossed on the speed change map, the speed change mechanism control section 82 determines a new target shift speed for the speed change mechanism TM. The target shift speed is also changed in the case where the shift position is changed. For example, the target shift speed may be changed in the case where the shift position is changed to the second range or the low range. Here, the term "upshift" means switching from a shift speed with a higher speed ratio to a shift speed with a lower speed ratio. The term "downshift" means switching from a shift speed with a lower speed ratio to a shift speed with a higher speed ratio.

In the case where shift speed switching control (speed change control) is to be performed, the speed change mechanism control section 82 controls the hydraulic pressure command for the friction engagement elements B1, C1, . . . to engage and disengage the friction engagement elements in order to switch the shift speed established in the speed change mechanism TM to the target shift speed. In this event, the speed change mechanism control section 82 performs so-called "clutch-to-clutch shifting" in which one of friction engagement elements that are engaged before the shifting (hereinafter referred to as a "disengagement-side element") is disengaged and one of friction engagement elements that are disengaged before the shifting (hereinafter referred to as an "engagement-side element") is engaged. For example, in the case where a downshift is to be performed, the speed change mechanism control section 82 performs downshift control in which the disengagement-side element, which is one of friction engagement elements for establishing the higher shift speed with a lower speed ratio, is disengaged and the engagement-side element, which is one of friction engagement elements for establishing the lower shift speed with a higher speed ratio, is engaged. In the case where an upshift is to be performed, meanwhile, the speed change mechanism control section 82 performs upshift control in which the disengagement-side element, which is one of friction engagement elements for establishing the lower shift speed with a higher speed ratio, is disengaged and the engagement-side element, which is one of friction engagement elements for establishing the higher shift speed with a lower speed ratio, is engaged.

When switching between shift speeds, in addition, the during-shifting rotational speed variation control section 40 to be discussed later performs during-shifting rotational speed variation control by causing both the rotary electric machine MG and the engine E to output the rotation-varying torque command value Ta in order to vary the rotational speed Ni of the input shaft T from a synchronous rotational speed before the shifting to a synchronous rotational speed after the shifting.

3-3-2. Engine Separation Clutch Control Section

The engine separation clutch control section 83 controls the engagement state of the engine separation clutch CL. In the embodiment, the engine separation clutch control section 83 controls the hydraulic pressure to be supplied to the engine separation clutch CL via the hydraulic pressure control device PC such that the transfer torque capacity of the engine separation clutch CL matches a transfer torque capacity command provided from the vehicle control unit 34. Specifically, the engine separation clutch control section 83 provides the hydraulic pressure control device PC with a command for a target hydraulic pressure (command pressure) set on the basis of the target transfer torque capacity command, and the hydraulic pressure control device PC supplies the engine separation clutch CL with a hydraulic pressure corresponding to the target hydraulic pressure (command pressure) according to the command. In the embodiment, the engine separation clutch L is controlled to the direct-coupling engagement state unless stated otherwise.

3-4. Vehicle Control Unit

The vehicle control unit 34 includes functional sections that control integration of various torque control performed for the engine E, the rotary electric machine MG; the speed change mechanism TM, the engine separation clutch CL, and so forth, engagement control for the friction engagement elements, and so forth over the entire vehicle drive device 1.

The vehicle control unit 34 calculates vehicle required torque Tr, which is a target drive force to be transferred from the input shaft I side to the output shaft O side, and determines the drive mode of the engine E and the rotary electric machine MG, in accordance with the accelerator operation amount, the vehicle speed, the charge amount of the battery, and so forth. Then, the vehicle control unit 34 calculates target output torque for the engine E, target output torque for the rotary electric machine MG, and a target transfer torque capacity for the engine separation clutch CL in accordance with the vehicle required torque Tr and the drive mode to provide the calculated values to the other control units 32 and 33 and the engine control device 31 for integration control.

3-4-1. During-Shifting Rotational Speed Variation Control Section

In the embodiment, as described above, the vehicle control unit 34 includes the during-shifting rotational speed variation control section 40. When switching between shift speeds of the speed change mechanism TM, the during-shifting rotational speed variation control section 40 calculates a rotation-varying torque command value Ta, which is a command value for torque that the drive force source is caused to output to vary the rotational speed Ni of the input shaft I, causes the rotary electric machine MG to output torque in accordance with the rotation-varying torque command value Ta, and in the case where it is determined that the absolute value of the torque that the rotary electric machine MG is caused to output will become more than a predetermined threshold, executes during-shifting rotational speed variation control by causing both the rotary electric machine MG and the engine E to output torque corresponding to the rotation-varying torque command value Ta such that the output torque of the rotary electric machine MG becomes equal to or less than the predetermined threshold.

It is determined that the absolute value of the torque that the rotary electric machine MG is caused to output will become more than a predetermined threshold in the case where it is determined that the absolute value of the torque that the rotary electric machine MG is caused to output will become more than the predetermined threshold at least once during the during-shifting rotational speed variation control. In the case where such a determination is made at least once, both the rotary electric machine MG and the engine E are caused to output torque corresponding to the rotation-varying torque command value Ta during the during-shifting rotational speed variation control.

Figure 3:
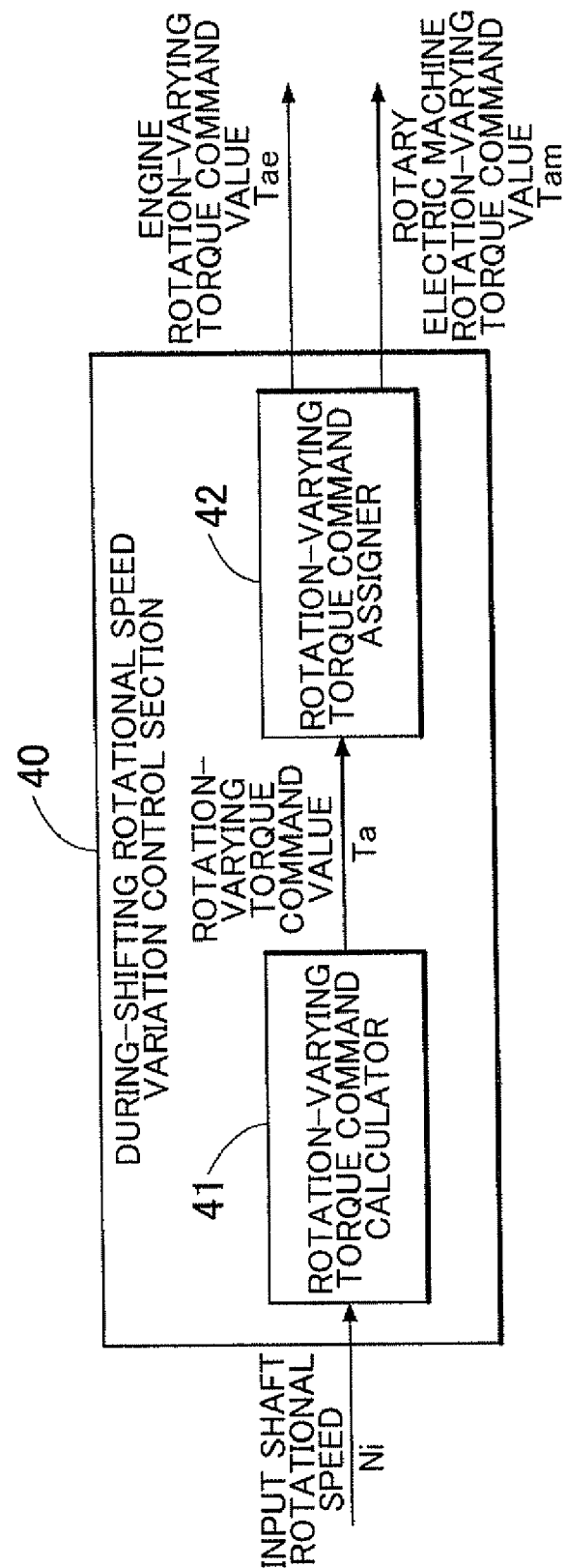
FIG. 3 is a block diagram showing the configuration of a during-shifting rotational speed variation control section according to the embodiment of the present invention.

In the embodiment, as shown in FIG. 3, the during-shifting rotational speed variation control section 40 includes a rotation-varying torque command calculator 41 and a rotation-varying torque command assigner 42.

The rotation-varying torque command calculator 41 calculates the rotation-varying torque command value Ta when switching between shift speeds.

The rotation-varying torque command assigner 42 causes the rotary electric machine MG to output torque in accordance with the rotation-varying torque command value Ta. In this event, in the case where it is determined that the absolute value of the torque that the rotary electric machine MG is caused to output will become more than the predetermined threshold, the rotation-varying torque command assigner 42 assigns the rotation-varying torque command value Ta to both the rotary electric machine MG and the engine E to calculate an engine rotation-varying torque command value Tae and a rotary electric machine rotation-varying torque command value Tarn such that the output torque of the rotary electric machine MG becomes equal to or less than the predetermined threshold.

In the embodiment, the predetermined threshold is set to an upper limit value (absolute value) or a lower limit value (absolute value) as the maximum value of torque that can be output from the rotary electric machine MG. That is, in the case where it is determined that the torque that the rotary electric machine MG is caused to output will become more than the upper limit value in the positive direction, the rotation-varying torque command assigner 42 causes both the rotary electric machine MG and the engine E to output torque corresponding to the rotation-varying torque command value Ta such that the output torque of the rotary electric machine MG becomes equal to or less than the upper limit value. In the case where it is determined that the torque that the rotary electric machine MG is caused to output will become less than the lower limit value in the negative direction, meanwhile, the rotation-varying torque command assigner 42 causes both the rotary electric machine MG and the engine E to output torque corresponding to the rotation-varying torque command value Ta such that the output torque of the rotary electric machine MG becomes equal to or more than the lower limit value.

The predetermined threshold may be set to a value that is less in magnitude than the upper limit value (absolute value) or the lower limit value (absolute value) as the maximum value of torque that can be output from the rotary electric machine MG.

Then, in the embodiment, the vehicle control unit 34 reflects the engine rotation-varying torque command value Tae in the target output torque for the engine E to cause the engine E to output torque corresponding to the engine rotation-varying torque command value Tae. The vehicle control unit 34 also reflects the rotary electric machine rotation-varying torque command value Tam in the target output torque for the rotary electric machine MG to cause the rotary electric machine MG to output torque corresponding to the rotary electric machine rotation-varying torque command value Tam.

With such a configuration, when switching between shift speeds, the rotary electric machine MG can be caused to output torque corresponding to the rotation-varying torque command value Ta, and in the case where it is determined that the absolute value of the torque that the rotary electric machine MG is caused to output will become more than the predetermined threshold, both the rotary electric machine MG and the engine E can be caused to output torque corresponding to the rotation-varying torque command value Ta.

Accordingly, the rotary electric machine MG, which outputs torque with high responsiveness and accuracy compared to the engine E, can be caused to output torque corresponding to the rotation-varying torque command value Ta in priority. Thus, it is possible to improve the control accuracy and the responsiveness of variations in rotational speed Ni of the input shaft I when switching between shift speeds. Accordingly, it is possible to suppress occurrence of a torque shock and to improve the responsiveness of variations in rotational speed Ni of the input shaft I when switching between shift speeds.

In the case where it is determined that the absolute value of the torque that the rotary electric machine MG is caused to output will become more than the predetermined threshold, not only the rotary electric machine MG but also the engine E is caused to output torque corresponding to the rotation-varying torque command value Ta. Thus, the magnitude of variations in rotational speed Ni of the input shaft I can be increased when switching between shift speeds.

In the embodiment, when switching between shift speeds, the during-shifting rotational speed variation control section 40 varies the rotation-varying torque command value Ta to vary the rotational speed Ni of the input shaft I from the synchronous rotational speed before the shifting to the synchronous rotational speed after the shifting. Hereinafter, the period for which the rotational speed Ni of the input shaft I is varied is referred to as an "inertia control phase".

More specifically, the during-shifting rotational speed variation control section 40 increases the absolute value of the rotation-varying torque command value Ta after the rotational speed Ni of the input shaft I starts varying from the synchronous rotational speed before the shifting, and decreases the absolute value of the rotation-varying torque command value Ta in the case where the rotational speed Ni of the input shaft I has approximated the synchronous rotational speed after the shifting. This allows the rotational speed Ni of the input shaft I to vary from the synchronous rotational speed before the shifting to the synchronous rotational speed after the shifting. In addition, it is possible to approximate (synchronize) a target acceleration, which is variations in rotational speed Ni of the input shaft I, to a rotational acceleration, which is variations in synchronous rotational speed after the shifting, when the rotational speed Ni of the input shaft I reaches the synchronous rotational speed after the shifting, which suppresses occurrence of a torque shock during engagement of the engagement-side element.

Here, the synchronous rotational speed of the input shaft I at each shift speed before and after the shifting is set to a rotational speed obtained by multiplying the rotational speed of the output shaft O by the speed ratio of the shift speed. That is, the synchronous rotational speed after the shifting is the rotational speed Ni of the input shaft I in the case where the rotational speed of an engagement member of the engagement-side element on the input shaft side varies to match (synchronize with) the rotational speed of an engagement member of the engagement-side element on the output shaft side. Likewise, the synchronous rotational speed before the shifting is the rotational speed Ni of the input shaft I in the case where the rotational speed of an engagement member of the disengagement-side element on the input shaft side matches (synchronizes with) the rotational speed of an engagement member of the disengagement-side element on the output shaft side.

In order to accurately approximate variations in rotational speed Ni of the input shaft I to variations in synchronous rotational speed after the shifting when the rotational speed Ni of the input shaft I reaches the synchronous rotational speed after the shifting, the during-shifting rotational speed variation control section 40 varies the rotation-varying torque command value Ta in a feedforward manner, and varies the rotation-varying torque command value Ta in a feedback manner in addition.

In the embodiment, the rotation-varying torque command calculator 41 can calculate as the rotation-varying torque command value Ta at least a feedback command value Tafb that varies the rotation-varying torque command value Ta in a feedback manner such that the rotational speed Ni of the input shaft I follows target rotational speed variation αo. Then, the rotation-varying torque command assigner 42 calculates a rotary electric machine feedback command value Tafbm, which is a feedback command value for the rotary electric machine MG, in priority to that for the engine E.

With such a configuration, the feedback command value Tafb for the rotary electric machine MG which outputs torque with relatively high responsiveness and accuracy, is calculated in priority to the feedback command value for the engine E. Thus, feedback control can be performed with high responsiveness and accuracy. Accordingly, even in the case where the rotational speed Ni of the input shaft I fluctuates from the target rotational speed variation αo because of fluctuations in characteristics of the vehicle drive device 1 or disturbance factors such as control errors of the control device 30, the rotational speed Ni of the input shaft I can be robustly maintained at the target rotational speed variation αo through feedback control that uses the rotary electric machine MG.

In the embodiment, the rotation-varying torque command calculator 41 can calculate as the rotation-varying torque command value Ta a feedforward command value Taff that varies the rotation-varying torque command value Ta in a feedforward manner and the feedback command value Tafb which varies the rotation-varying torque command value Ta in a feedback manner such that the rotational speed Ni of the input shaft I follows the target rotational speed variation αo.

When decreasing the absolute value of the rotation-varying torque command value Ta, the rotation-varying torque command assigner 42 decreases the absolute value of a rotary electric machine feedforward command value Taffm, which is a feedforward command value for the rotary electric machine MG, in priority to the absolute value of an engine feedforward command value Taffe, which is a feedforward command value for the engine E. In addition, the rotation-varying torque command assigner 42 calculates the rotary electric machine feedback command value Tafbm, which is a feedback command value for the rotary electric machine MG, in priority to that for the engine E after the absolute value of the rotary electric machine feedforward command value Taffm starts decreasing.

With such a configuration, when decreasing the absolute value of the rotation-varying torque command value Ta, the absolute value of the rotary electric machine feedforward command value Taffm is decreased in priority to the absolute value of the engine feedforward command value Taffe. Thus, a margin allowing the rotary electric machine MG to output torque corresponding to the feedback command value Tafb can be increased immediately after the absolute value of the rotation-varying torque command value Ta starts decreasing. Accordingly, the rotational speed Ni of the input shaft I can be robustly maintained at the target rotational speed variation αo through feedback control that uses the rotary electric machine MG immediately after the absolute value of the rotation-varying torque command value Ta starts decreasing.

In the embodiment, as discussed later, the absolute value of the rotation-varying torque command value Ta is decreased when the rotational speed Ni of the input shaft I has approximated the synchronous rotational speed after the shifting, and variations in rotational speed Ni of the input shaft I can be decreased accurately through feedback control that uses the rotary electric machine MG. Accordingly, variations (rotational acceleration) in rotational speed Ni of the input shaft I can be accurately approximated to variations (rotational acceleration) in synchronous rotational speed after the shifting when the rotational speed Ni of the input shaft I reaches the synchronous rotational speed after the shifting. Thus, it is possible to accurately suppress occurrence of a torque shock when switching between shift speeds.

The rotation-varying torque command calculator 41 and the rotation-varying torque command assigner 42 according to the embodiment will be described in detail below.

3-4-1-1. Rotation-Varying Torque Command Calculator

Figure 4:
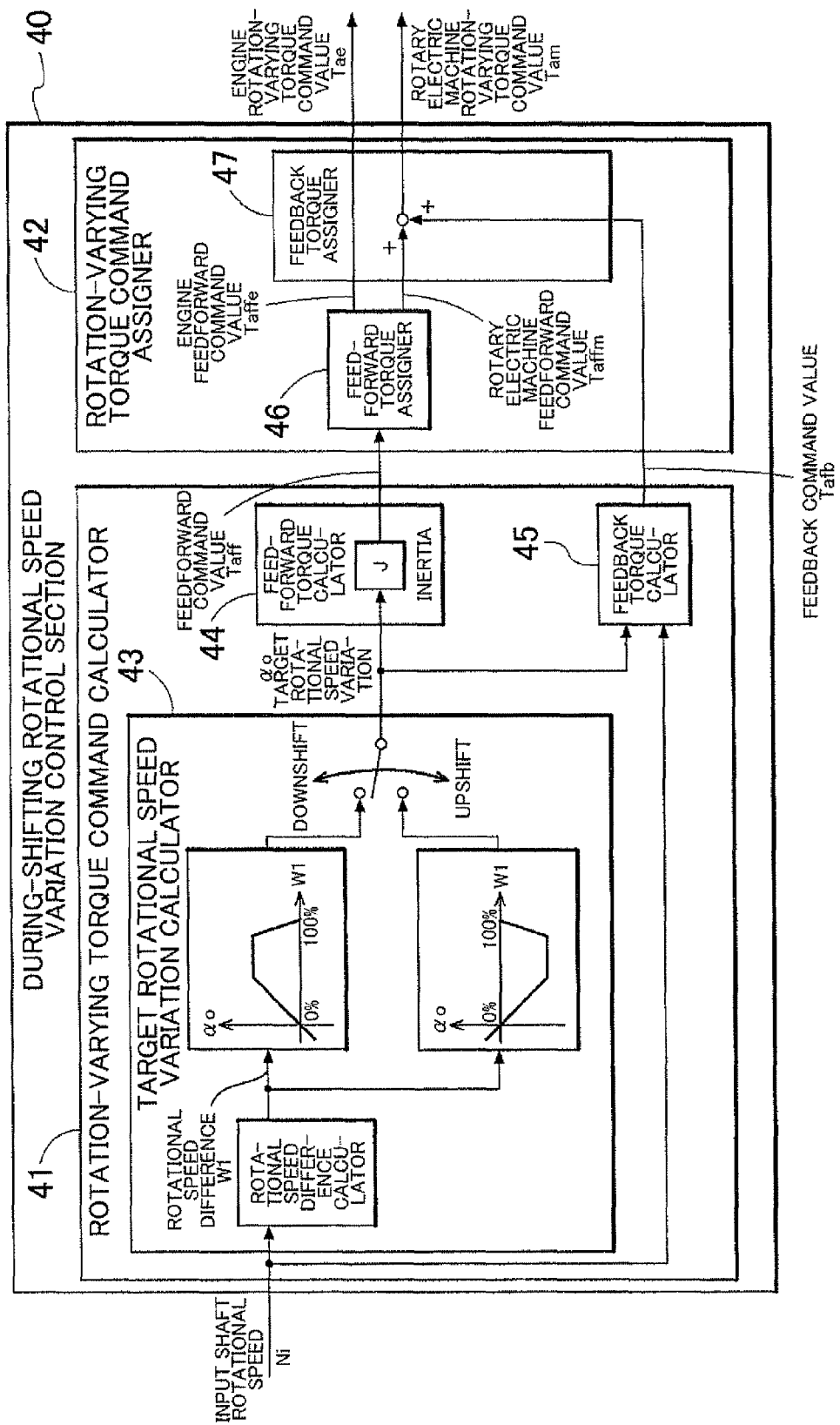
FIG. 4 is a block diagram showing a detailed configuration of the during-shifting rotational speed variation control section according to the embodiment of the present invention.

In the embodiment, as shown in FIG. 4, the rotation-varying torque command calculator 41 includes a feedforward torque calculator 44 that calculates the feedforward command value Taff and a feedback torque calculator 45 that calculates the feedback command value Tafb. The calculators 44 and 45 calculate the feedforward command value Taff and the feedback command value Tafb, respectively, on the basis of the target rotational speed variation αo. In the embodiment, the target rotational speed variation αo serves as a target value for the rotational acceleration of the input shaft I.

In the embodiment, the feedforward torque calculator 44 sets the feedforward command value Taff to torque calculated by multiplying the target rotational speed variation αo (rotational acceleration) by a moment of inertia (inertia) J of various members such as the engine E and the rotary electric machine MG which rotate together with the input shaft I. Meanwhile, the feedback torque calculator 45 performs feedback control in which the feedback command value Tafb is increased and decreased such that the rotational acceleration of the input shaft I calculated on the basis of the rotational speed Ni of the input shaft I matches the target rotational speed variation αo (target rotational acceleration).

The rotation-varying torque command calculator 41 also includes a target rotational speed variation calculator 43 that calculates the target rotational speed variation αo on the basis of the rotational speed Ni of the input shaft I. In the embodiment, the absolute value of the target rotational speed variation αo is increased after the rotational speed Ni of the input shaft I starts varying from the synchronous rotational speed before the shifting, and decreased as the rotational speed Ni of the input shaft I approximates the synchronous rotational speed after the shifting. This allows the rotational speed Ni of the input shaft I to vary from the synchronous rotational speed before the shifting to the synchronous rotational speed after the shifting. Further, it is possible to approximate (synchronize) variations (rotational acceleration) in rotational speed Ni of the input shaft I to variations (rotational acceleration) in synchronous rotational speed after the shifting when the rotational speed Ni of the input shaft I has reached the synchronous rotational speed after the shifting, which suppresses occurrence of a torque shock during engagement of the engagement-side element.

The target rotational speed variation calculator 43 calculates a rotational speed difference W1 between the rotational speed Ni of the input shaft I and the synchronous rotational speed after the shifting on the basis of the rotational speed Ni of the input shaft I to set the target rotational speed variation αo in accordance with the rotational speed difference W1. Here, the rotational speed difference W1 is calculated by subtracting the synchronous rotational speed after the shifting from the rotational speed Ni of the input shaft in the case of an upshift, and by subtracting the rotational speed Ni of the input shaft I from the synchronous rotational speed after the shifting in the case of a downshift. That is, the rotational speed difference W1 is the absolute value of the rotational speed difference between the rotational speed Ni of the input shaft I and the synchronous rotational speed after the shifting.

In the example shown in FIG. 4, the rotational speed difference W1 is a value normalized using the rotational speed difference (absolute value) between the synchronous rotational speed before the shifting and the synchronous rotational speed after the shifting. That is, the rotational speed difference W1 is a value obtained by dividing the actual rotational speed difference W1 by the difference between the synchronous rotational speeds before and after the shifting and multiplying the resulting quotient by 100%. In the case where the rotational speed difference W1 is 100%, the rotational speed Ni of the input shaft I matches the synchronous rotational speed before the shifting. In the case where the rotational speed difference W1 is 0%, the rotational speed Ni of the input shaft I matches the synchronous rotational speed after the shifting.

In addition, the target rotational speed variation calculator 43 includes a target variation setting map in which the target rotational speed variation αo is set in accordance with the rotational speed difference W1, and calculates the target rotational speed variation αo on the basis of the rotational speed difference W1 and the target variation setting map. In the example shown in FIG. 4, the target rotational speed variation calculator 43 includes a target variation setting map for an upshift and a target variation setting map for a downshift, and switches between the target variation setting maps depending on which of an upshift and a downshift is to be performed.

The target rotational speed variation αo, which is used to calculate the rotation-varying torque command value Ta, may be set to a value obtained by adding the acceleration of the synchronous rotational speed after the shifting to the target rotational speed variation αo calculated as described above. With such a configuration, it is possible to accurately match (synchronize) variations (rotational acceleration) in rotational speed Ni of the input shaft I to variations (rotational acceleration) in synchronous rotational speed after the shifting when the rotational speed Ni of the input shaft I reaches the synchronous rotational speed after the shifting even in the case where the absolute value of the acceleration of the synchronous rotational speed after the shifting is large, which accurately suppresses occurrence of a torque shock.

3-4-1-2. Rotation-Varying Torque Command Assigner

As described above, the rotation-varying torque command assigner 42 causes the rotary electric machine MG to output torque in accordance with the rotation-varying torque command value Ta, and in the case where it is determined that the absolute value of the torque that the rotary electric machine MG is caused to output will become more than a predetermined threshold, the rotation-varying torque command assigner 42 causes both the rotary electric machine MG and the engine E to output torque corresponding to the rotation-varying torque command value Ta such that the output torque of the rotary electric machine MG becomes equal to or less than the predetermined threshold.

More specifically, in the case where it is determined that the absolute value of the torque that the rotary electric machine MG is caused to output in accordance with the rotation-varying torque command value Ta will become more than the predetermined threshold, the rotation-varying torque command assigner 42 causes the engine E to output an amount of torque by which the predetermined threshold is exceeded.

In the embodiment, as shown in FIG. 4, the rotation-varying torque command assigner 42 includes a feedforward torque assigner 46 and a feedback torque assigner 47.

<Feedforward Torque Assigner>

In the embodiment, as described above, the feedforward torque assigner 46 causes the rotary electric machine MG to output torque in accordance with the feedforward command value Taff serving as the rotation-varying torque command value Ta, and in the case where it is determined that the absolute value of the torque that the rotary electric machine MG is caused to output will become more than a predetermined threshold, the feedforward torque assigner 46 causes both the rotary electric machine MG and the engine E to output torque corresponding to the feedforward command value Taff such that the output torque of the rotary electric machine MG becomes equal to or less than the predetermined threshold.

In the embodiment, the feedforward torque assigner 46 increases the absolute value of the rotary electric machine feedforward command value Taffm, within a range in which the output torque of the rotary electric machine MG is equal to or less than the predetermined threshold, in priority to the absolute value of the engine feedforward command value Taffe before the absolute value of the rotation-varying torque command value Ta starts decreasing.

In the embodiment, when increasing and decreasing the absolute value of the feedforward command value Taff, the feedforward torque assigner 46 gives the order of priority to the engine feedforward command value Taffe and the rotary electric machine feedforward command value Taffm, and increases and decreases the engine feedforward command value Taffe and the rotary electric machine feedforward command value Taffm.

That is, when increasing the absolute value of the feedforward command value Taff, the feedforward torque assigner 46 increases the absolute value of the rotary electric machine feedforward command value Taffm in priority to the absolute value of the engine feedforward command value Taffe until the absolute value of the output torque of the rotary electric machine MG reaches the predetermined threshold.

In the example, when increasing the absolute value of the feedforward command value Taff, the feedforward torque assigner 46 increases the absolute value of the rotary electric machine feedforward command value Taffm until the absolute value of the output torque of the rotary electric machine MG reaches the predetermined threshold, and thereafter increases the absolute value of the engine feedforward command value Taffe.

In the embodiment, in the case where it is determined that the absolute value of the torque that the rotary electric machine MG is caused to output will become more than the predetermined threshold when increasing the absolute value of the feedforward command value Taff, the during-shifting rotational speed variation control section 40 causes both the rotary electric machine MG and the engine E to output torque corresponding to the rotation-varying torque command value Ta during the during-shifting rotational speed variation control.

On the other hand, when decreasing the absolute value of the feedforward command value Taff, as described above, the feedforward torque assigner 46 decreases the absolute value of the rotary electric machine feedforward command value Taffm in priority to the absolute value of the engine feedforward command value Taffe.

In the example, when decreasing the absolute value of the feedforward command value Taff, the feedforward torque assigner 46 decreases the absolute value of the rotary electric machine feedforward command value Taffm to zero, and thereafter decreases the absolute value of the engine feedforward command value Taffe.

<Feedback Torque Assigner>

In the embodiment, as described above, the feedback torque assigner 47 calculates the rotary electric machine feedback command value Tafbm, which is a feedback command value for the rotary electric machine MG, in priority to that for the engine E after the absolute value of the rotary electric machine feedforward command value Taffm starts decreasing.

In the example, the feedback torque assigner 47 calculates the rotary electric machine feedback command value Tafbm, which is a feedback command value for the rotary electric machine MG, after the absolute value of the rotary electric machine feedforward command value Taffm is decreased to zero.

In the example, in addition, the feedback torque assigner 46 calculates all the feedforward command value Taff as the engine feedforward command value Taffe after the absolute value of the rotary electric machine feedforward command value Taffm is decreased to zero. Then, the feedback torque assigner 47 calculates all the feedback command value Tafb as the rotary electric machine feedback command value Tafbm.

Then, as shown in FIG. 4, the rotation-varying torque command assigner 42 calculates the engine feedforward command value Taffe as the engine rotation-varying torque command value Tae, and calculates as the rotary electric machine rotation-varying torque command value Tam torque obtained by adding the rotary electric machine feedforward command value Taffm and the rotary electric machine feedback command value Tafbm.

3-4-1-3. Upshift (Rotary Electric Machine Outputs Feedback Command Value)

Next, the processes performed by the during-shifting rotational speed variation control section 40 and the speed change mechanism control section 82 in the case where an upshift is performed as switching between shift speeds will be described with reference to the time chart of FIG. 5.

In the case where it is determined that switching between shift speeds is to be performed, the speed change mechanism control section 82 at least controls the disengagement-side element from the direct engagement state to the slipping engagement state or the disengaged state in order to enable the rotational speed Ni of the input shaft I to vary from the synchronous rotational speed before the shifting.

Figure 5:
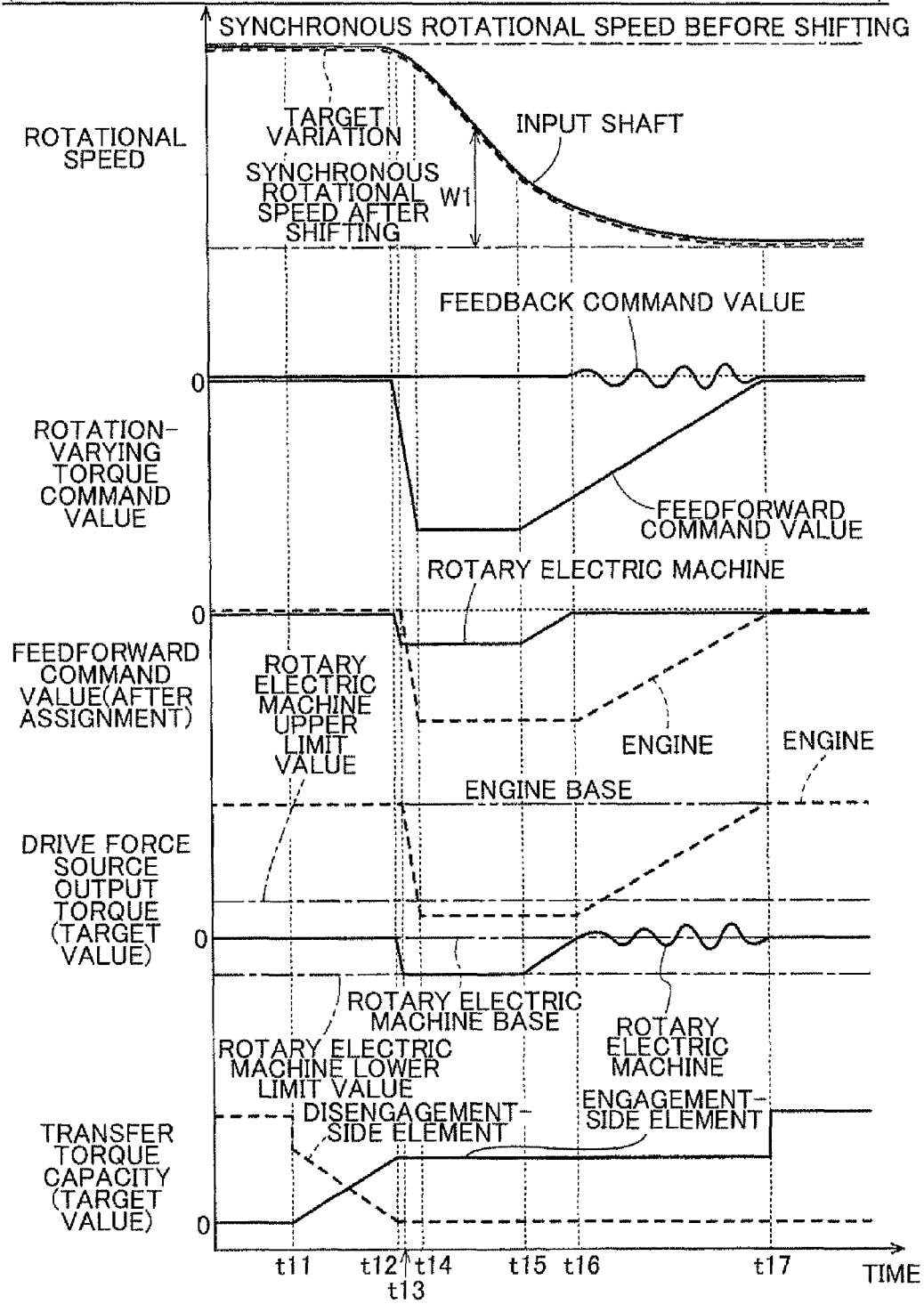
FIG. 5 is a timing chart showing a process performed by the control device according to the embodiment of the present invention.

In the example shown in FIG. 5, in the case where the target shift speed is changed and it is determined that an upshift is to be performed (time t11), the speed change mechanism control section 82 gradually decreases the target transfer torque capacity for the disengagement-side element from a complete engagement capacity, and gradually increases the target transfer torque capacity for the engagement-side element (from time t11 to time t12). Here, the term "complete engagement capacity" refers to a transfer torque capacity at which an engaged state without slipping can be maintained even if torque transferred from the drive force source to the input shaft I fluctuates.

The period (from time t11 to time t12) in which the transfer torque capacities of the engagement-side element and the disengagement-side element are interchanged is referred to as a "torque control phase". In the torque control phase, the torque relationship is transitioned from the state with the shift speed before the shifting to the state with the shift speed after the shifting, but the rotational speed relationship is not varied but is maintained at the state with the shift speed before the shifting. Consequently, the engagement-side element is brought from the disengaged state into the slipping engagement state, and the disengagement-side element is brought from the direct engagement state into the disengaged state. That is, in the torque control phase, the rotational speed relationship is not varied but remains in the state with the shift speed before the shifting, and only the torque distribution is transitioned from the state with the shift speed before the shifting to the state with the shift speed after the shifting. Then, in the case where the torque distribution is completely transitioned so that the disengagement-side element is brought from the direct engagement state into the disengaged state and the engagement-side element is brought from the disengaged state into the slipping engagement state (time t12), the speed change mechanism control section 82 transitions the control state from the torque control phase to the inertia control phase.

In the case where at least the disengagement-side element is brought from the direct engagement state into the slipping engagement state or the disengaged state, the during-shifting rotational speed variation control section 40 starts a sequence of during-shifting rotational speed variation control.

In the example shown in FIG. 5, in the case where a transition is made from the torque control phase to the inertia control phase (time t12), the during-shifting rotational speed variation control section 40 starts the sequence of during-shifting rotational speed variation control.

In the example shown in FIG. 5, in addition, the speed change mechanism control section 82 does not vary the target transfer torque capacity for the engagement-side element for the purpose of varying the rotational speed Ni of the input shaft I during the during-shifting rotational speed variation control (during the inertia control phase) (from time t12 to time t17).

Meanwhile, the during-shifting rotational speed variation control section 40 varies the rotation-varying torque command value Ta for the drive force source in order to vary the rotational speed Ni of the input shaft I from the synchronous rotational speed before the shifting to the synchronous rotational speed after the shifting during the during-shifting rotational speed variation control (during the inertia control phase) (from time t12 to time t17). During the during-shifting rotational speed variation control, the target transfer torque capacity for the engagement-side element or the disengagement-side element may be varied, in addition to the rotation-varying torque command value Ta, to vary the rotational speed Ni of the input shaft I.

In the case where the during-shifting rotational speed variation control is started (time t12), the during-shifting rotational speed variation control section 40 increases the absolute value of the feedforward command value Taff serving as the rotation-varying torque command value Ta. In the case of an upshift shown in FIG. 5, the feedforward command value Taff is decreased from zero. In the example shown in FIG. 5, in addition, the absolute value of the feedforward command value Taff is gradually increased to a predetermined value (from time t12 to time t14). The absolute value of the feedforward command value Taff may be increased stepwise to the predetermined value. Alternatively, the absolute value of the feedforward command value Taff may be increased along any time-varying waveform.

When increasing the absolute value of the feedforward command value Taff, the during-shifting rotational speed variation control section 40 increases the absolute value of the rotary electric machine feedforward command value Taffm until the absolute value of the output torque of the rotary electric machine MG (the target output torque for the rotary electric machine MG) reaches the predetermined threshold (from time t12 to time t13), and thereafter increases the absolute value of the engine feedforward command value Taffe (from time t13 to time t14). In the example, as described above, the predetermined threshold is set to an upper limit value (absolute value) or a lower limit value (absolute value) as the maximum value of torque that can be output from the rotary electric machine MG. In the case of an upshift shown in FIG. 5, the during-shifting rotational speed variation control section 40 decreases the rotary electric machine feedforward command value Taffm from zero until the target output torque for the rotary electric machine MG reaches the lower limit value that can be output (from time t12 to time t13).

In the case where the feedback command value Tafb is not calculated, the during-shifting rotational speed variation control section 40 sets the engine feedforward command value Taffe to the engine rotation-varying torque command value Tae, and sets the rotary electric machine feedforward command value Taffm to the rotary electric machine rotation-varying torque command value Tam. The vehicle control unit 34 sets the target output torque for the engine E to a value obtained by adding the engine rotation-varying torque command value Tae to the target output torque (base value) for the engine E to cause the engine E to output torque corresponding to the engine rotation-varying torque command value Tae. The vehicle control unit 34 also sets the target output torque for the rotary electric machine MG to a value obtained by adding the rotary electric machine rotation-varying torque command value Tam to the target output torque (base value) for the rotary electric machine MG to cause the rotary electric machine MG to output torque corresponding to the rotary electric machine rotation-varying torque command value Tam. The target output torque (base value) for the rotary electric machine MG before addition of the engine rotation-varying torque command value Tae is set to zero in the example shown in FIG. 5, but may be set to a value other than zero.

When the absolute value of the rotation-varying torque command value Ta is increased, the rotational speed Ni of the input shaft I starts varying from the synchronous rotational speed before the shifting toward the synchronous rotational speed after the shifting (at and after time t12). In the case where the rotational speed Ni of the input shaft I has approximated the synchronous rotational speed after the shifting, the during-shifting rotational speed variation control section 40 decreases the absolute value of the rotation-varying torque command value Ta. Consequently, variations (target rotational acceleration) in rotational speed Ni of the input shaft I can be approximated to variations (target rotational acceleration) in synchronous rotational speed after the shifting when the rotational speed Ni of the input shaft I reaches the synchronous rotational speed after the shifting. In the example shown in FIG. 5, in the case where the rotational speed difference W1 (absolute value) between the rotational speed Ni of the input shaft I and the synchronous rotational speed after the shifting has decreased to a predetermined value (time t15), the during-shifting rotational speed variation control section 40 starts gradually decreasing the absolute value of the feedforward command value Taff serving as the rotation-varying torque command value Ta. The during-shifting rotational speed variation control section 40 may start gradually decreasing the absolute value of the feedforward command value Taff serving as the rotation-varying torque command value Ta in the case where the time having elapsed after the start of the during-shifting rotational speed variation control has reached a predetermined value. Alternatively, the absolute value of the feedforward command value Taff may be decreased along any time-varying waveform.

When decreasing the absolute value of the feedforward command value Taff, the during-shifting rotational speed variation control section 40 decreases the absolute value of the rotary electric machine feedforward command value Taffm in priority to the absolute value of the engine feedforward command value Taffe. In the example shown in FIG. 5, the during-shifting rotational speed variation control section 40 decreases the absolute value of the engine feedforward command value Taffe after the absolute value of the rotary electric machine feedforward command value Taffm is decreased to zero (at and after time t16).

This allows the absolute value of the target output torque for the rotary electric machine MG to be decreased in priority so as to unfix the absolute value of the target output torque for the rotary electric machine MG from the maximum value that can be output immediately after the absolute value of the rotation-varying torque command value Ta starts decreasing, which enables the output torque of the rotary electric machine MG to vary in both the positive direction and the negative direction. Accordingly, the feedback command value Tafb which allows the rotary electric machine MG to output torque that varies in both the positive direction and the negative direction can be output immediately after the absolute value of the rotation-varying torque command value Ta starts decreasing.

Accordingly, the during-shifting rotational speed variation control section 40 calculates the rotary electric machine feedback command value Tafbm, which is a feedback command value for the rotary electric machine MG, in priority to that for the engine E after the absolute value of the rotary electric machine feedforward command value Taffm starts decreasing.

In the example shown in FIG. 5, the during-shifting rotational speed variation control section 40 calculates the rotary electric machine feedback command value Tafbm, which is a feedback command value for the rotary electric machine MG, after the absolute value of the rotary electric machine feedforward command value Taffm is decreased to zero (at and after time t16). Consequently, the width of variations in output torque of the rotary electric machine MG for feedback control can be balanced well between the positive direction and the negative direction. Thus, the amount of variations in output torque of the rotary electric machine MG can be increased in the positive direction and the negative direction to improve the response time of the feedback control, or can be adapted to disturbance in both the positive direction and the negative direction in a well-balanced manner.

The engine E is subjected to a significant response delay in control of the intake air amount and the supply fuel amount, and there is complex non-linear relationship between control parameters for the engine E such as the intake air amount, the supply fuel amount, and the ignition timing and the output torque of the engine E. Therefore, the responsiveness and the accuracy of the actual output torque of the engine E with respect to the target output torque for the engine E are low. Therefore, as discussed later, in the case where the engine E is caused to output the feedback command value Tafb, the rotational speed Ni of the input shaft I may not be caused to follow the target rotational speed variation αo responsively and accurately. Meanwhile, the engine E is capable of outputting high torque compared to the rotary electric machine MG in many cases.

In contrast, the rotary electric machine MG is subjected to a very slight response delay between supplied electric power and output torque, and there is predetermined relationship between the supplied electric power and the output torque of the rotary electric machine MG. Therefore, the responsiveness and the accuracy of the actual output torque of the rotary electric machine MG with respect to the target output torque for the rotary electric machine MG are high. Therefore, in the case where the rotary electric machine MG is caused to output the feedback command value Tafb, the rotational speed Ni of the input shaft I can be caused to follow the target rotational speed variation αo responsively and accurately.

Accordingly, in the embodiment, feedback control that uses the rotary electric machine MG can be executed to cause the rotational speed Ni of the input shaft I to accurately follow the target rotational speed variation αo immediately after the absolute value of the rotation-varying torque command value Ta starts decreasing. Therefore, even in the case where the rotational speed Ni of the input shaft I fluctuates from the target rotational speed variation αo because of fluctuations in characteristics of the vehicle drive device 1 or disturbance factors such as control errors of the control device 30, variations (rotational acceleration) in rotational speed Ni of the input shaft I can be robustly approximated (synchronized) to variations (rotational acceleration) in synchronous rotational speed after the shifting through feedback control that uses the rotary electric machine MG. Accordingly, occurrence of a torque shock during engagement of the engagement-side element can be suppressed robustly. In addition, feedback control can be started sufficiently long before the rotational speed Ni of the input shaft I reaches the synchronous rotational speed after the shifting. Thus, even in the case of large disturbance, variations (rotational acceleration) in rotational speed Ni of the input shaft I can be approximated to variations (rotational acceleration) in synchronous rotational speed after the shifting by the time when the rotational speed Ni of the input shaft I reaches the synchronous rotational speed after the shifting.

In the case where the rotational speed Ni of the input shaft I has reached the synchronous rotational speed after the shifting (time t17), the during-shifting rotational speed variation control section 40 terminates calculation of the rotation-varying torque command value Ta to terminate the sequence of during-shifting rotational speed variation control. That is, calculation of the feedforward command value Taff and the feedback command value Tafb is terminated. The sequence of during-shifting rotational speed variation control may be terminated in the case where the time having elapsed after the start of the during-shifting rotational speed variation control has reached a predetermined value.

In the case where the during-shifting rotational speed variation control is terminated (time t17), the speed change mechanism control section 82 increases the target transfer torque capacity for the engagement-side element to the complete engagement capacity to terminate the shift speed switching control.

3-4-1-4. Upshift (Engine Outputs Feedback Command Value)

Next, a comparative example in which an upshift is performed as in FIG. 5, and in which it is assumed that the absolute value of the engine feedforward command value Taffe is decreased in priority to the absolute value of the rotary electric machine feedforward command value Taffm when decreasing the absolute value of the feedforward command value Taff, unlike the embodiment, will be described with reference to FIG. 6.

Figure 6:
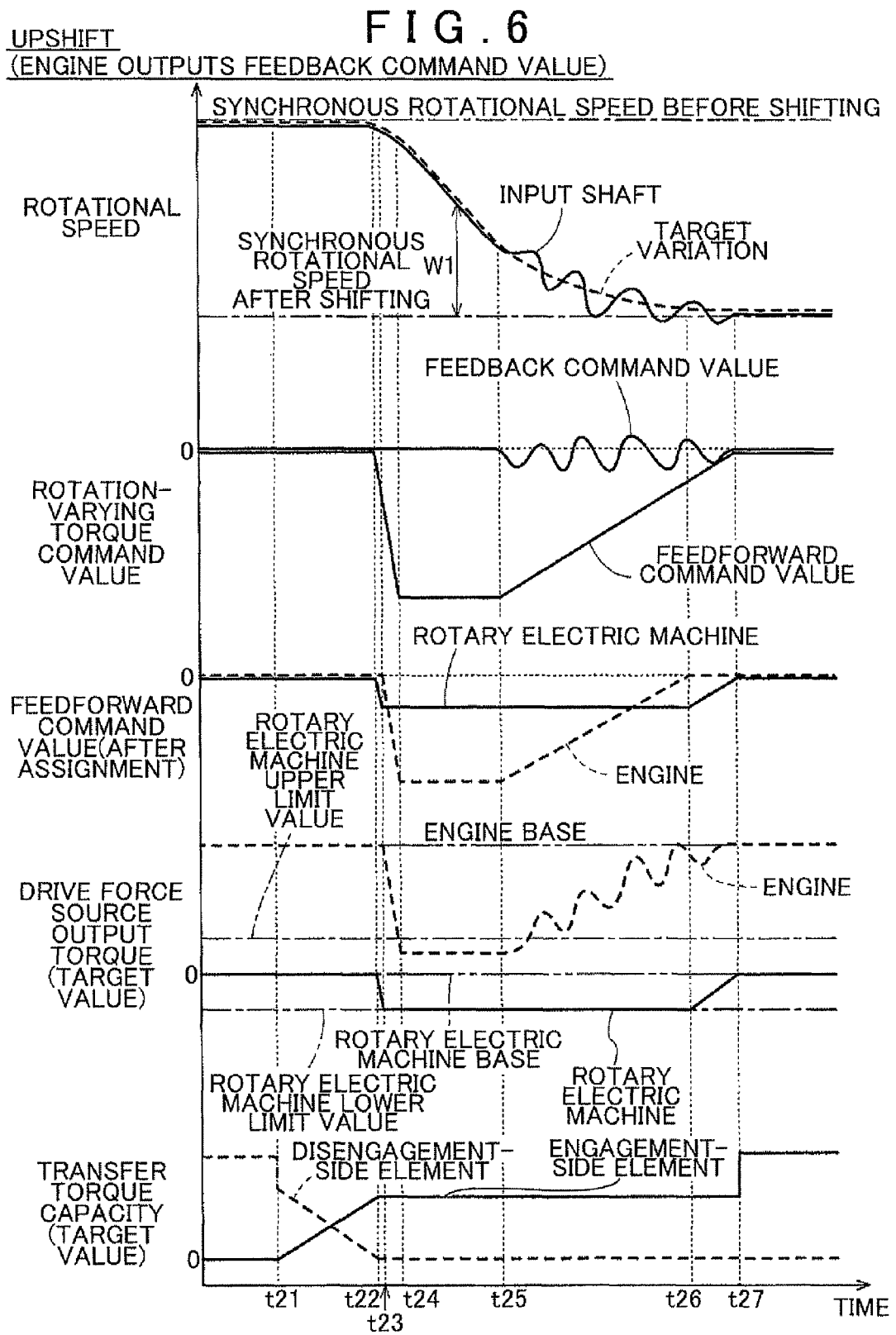
FIG. 6 is a timing chart showing a process performed by a control device that is partially different from that according to the embodiment of the present invention.

As shown in FIG. 6, after the absolute value of the rotation-varying torque command value Ta starts decreasing (at and after time t25), and after the absolute value of the engine feedforward command value Taffe is decreased to zero (at and after t26), the absolute value of the rotary electric machine feedforward command value Taffm is decreased. Accordingly, in the comparative example shown in FIG. 6, unlike the embodiment, the absolute value of the target output torque for the rotary electric machine MG is continuously fixed to the maximum value that can be output for a relatively long time after the absolute value of the rotation-varying torque command value Ta starts decreasing until the absolute value of the engine feedforward command value Taffe is decreased to zero (from time t25 to time t26). Therefore, the rotary electric machine MG may not be caused to output the feedback command value Tafb until immediately before the rotational speed Ni of the input shaft I reaches the synchronous rotational speed after the shifting. Accordingly, feedback control that uses the rotary electric machine MG may not be performed sufficiently long before the rotational speed Ni of the input shaft I reaches the synchronous rotational speed after the shifting. Therefore, it may be difficult to approximate (synchronize) variations (rotational acceleration) in rotational speed Ni of the input shaft I to variations (rotational acceleration) in synchronous rotational speed after the shifting by the time when the rotational speed Ni of the input shaft I reaches the synchronous rotational speed after the shifting in the ease of large disturbance. Accordingly, a torque shock may occur during engagement of the engagement-side element.

In the example shown in FIG. 6, a feedback command value is calculated for the engine E, unlike the embodiment, during a period for which the absolute value of the target output torque for the rotary electric machine MG is fixed to the maximum value. As described above, in the case where the engine E is caused to output torque corresponding to the feedback command value Tafb, the rotational speed Ni of the input shaft I may not be caused to follow the target rotational speed variation αo responsively and accurately. Therefore, as shown in the example of FIG. 6, the rotational speed Ni of the input shaft I fluctuates with respect to the target rotational speed variation αo. Thus, it is difficult to approximate (synchronize) variations (rotational acceleration) in rotational speed Ni of the input shaft I to variations (rotational acceleration) in synchronous rotational speed after the shifting when the rotational speed Ni of the input shaft I reaches the synchronous rotational speed after the shifting. Accordingly, a torque shock may occur during engagement of the engagement-side element.

3-4-1-5. Downshift (Rotary Electric Machine Outputs Feedback Command Value)

Next, the processes performed by the during-shifting rotational speed variation control section 40 and the speed change mechanism control section 82 in the case where a downshift is performed as switching between shift speeds, as opposed to the case where an upshift is performed shown in FIG. 5, will be described with reference to the time chart of FIG. 7.

In the case where it is determined that switching between shift speeds is to be performed, the speed change mechanism control section 82 at least controls the disengagement-side element from the direct engagement state to the slipping engagement state or the disengaged state in order to enable the rotational speed Ni of the input shaft I to vary from the synchronous rotational speed before the shifting.

Figure 7:
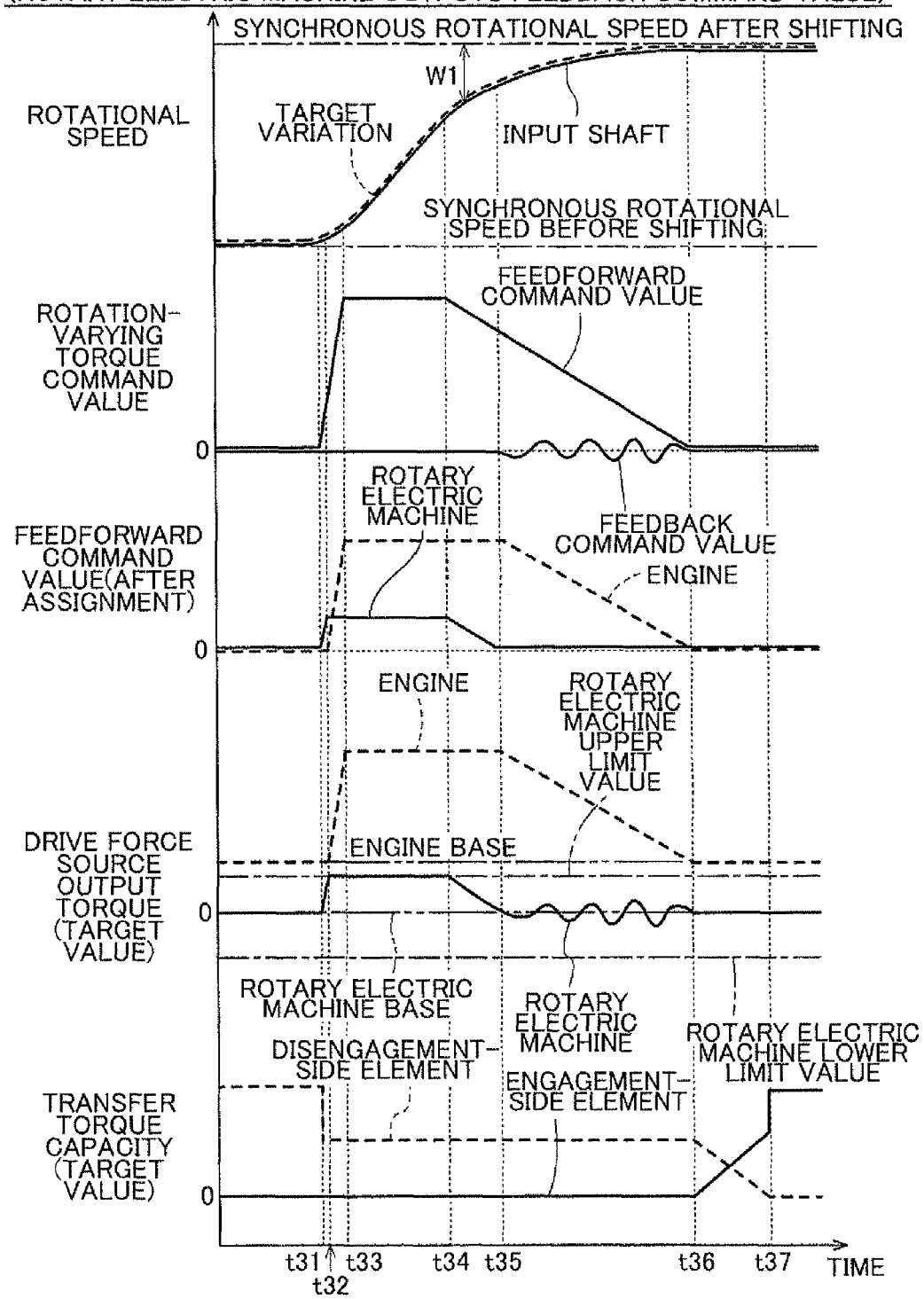
FIG. 7 is a timing chart showing a process performed by the control device according to the embodiment of the present invention.

In the example shown in FIG. 7, in the case where the target shift speed is changed and it is determined that a downshift is to be performed (time t31), the speed change mechanism control section 82 decreases the target transfer torque capacity for the disengagement-side element from the complete engagement capacity to bring the disengagement-side element into the slipping engagement state. Then, in the case where the disengagement-side element is brought into the slipping engagement state (time t31), the speed change mechanism control section 82 makes a transition to the inertia control phase.

In the case where at least the disengagement-side element is brought from the direct engagement state into the slipping engagement state or the disengaged state, the during-shifting rotational speed variation control section 40 starts a sequence of during-shifting rotational speed variation control.

In the example shown in FIG. 7, in the case where a transition is made to the inertia control phase (time t31), the during-shifting rotational speed variation control section 40 starts the sequence of during-shifting rotational speed variation control.

In the example shown in FIG. 7, in addition, the speed change mechanism control section 82 does not vary the target transfer torque capacity for the engagement-side element for the purpose of varying the rotational speed Ni of the input shaft I during the during-shifting rotational speed variation control (during the inertia control phase) (from time t31 to time t36).

Meanwhile, as in the case of an upshift shown in FIG. 5, the during-shifting rotational speed variation control section 40 varies the rotation-varying torque command value Ta for the drive force source in order to vary the rotational speed Ni of the input shaft I from the synchronous rotational speed before the shifting to the synchronous rotational speed after the shifting during the during-shifting rotational speed variation control (during the inertia control phase) (from time t31 to time t36). During the during-shifting rotational speed variation control, the target transfer torque capacity for the disengagement-side element or the engagement-side element may be varied, in addition to the rotation-varying torque command value Ta, to vary the rotational speed Ni of the input shaft I.

In the example of a downshift shown in FIG. 7, in the case where the inertia control phase is started (time t31), the during-shifting rotational speed variation control section 40 gradually increases the feedforward command value Taff from zero (from time t31 to time t33).

In the example of a downshift shown in FIG. 7, in addition, when increasing the feedforward command value Taff, the during-shifting rotational speed variation control section 40 increases the rotary electric machine feedforward command value Taffm from zero until the target output torque for the rotary electric machine MG reaches the upper limit value that can be output (from time t31 to time t32), and thereafter increases the engine feedforward command value Taffe (from time t32 to time t33).

In the example of a downshift shown in FIG. 7, when the rotation-varying torque command value Ta is increased, the rotational speed Ni of the input shaft I starts increasing from the synchronous rotational speed before the shifting toward the synchronous rotational speed after the shifting (at and after time t31). In addition, in the case where the rotational speed difference W1 (absolute value) between the rotational speed Ni of the input shaft I and the synchronous rotational speed after the shifting has decreased to a predetermined value (time t34), the during-shifting rotational speed variation control section 40 starts gradually decreasing the feedforward command value Taff serving as the rotation-varying torque command value Ta.

In the example of a downshift shown in FIG. 7, when decreasing the feedforward command value Taff, the during-shifting rotational speed variation control section 40 decreases the engine feedforward command value Taffe after the rotary electric machine feedforward command value Taffm is decreased to zero (at and after time t35).

As in the case of an upshift shown in FIG. 5, the target output torque for the rotary electric machine MG can be unfixed from the upper limit value that can be output to cause the rotary electric machine MG to output the feedback command value Tafb immediately after the absolute value of the rotation-varying torque command value Ta starts decreasing.

In the example of a downshift shown in FIG. 7, the during-shifting rotational speed variation control section 40 calculates the rotary electric machine feedback command value Tafbm after the rotary electric machine feedforward command value Taffm is decreased to zero (at and after time t35). Accordingly, even in the case where a downshift is performed, feedback control that uses the rotary electric machine MG can be executed to cause the rotational speed Ni of the input shaft I to accurately follow the target rotational speed variation αo immediately after the absolute value of the rotation-varying torque command value Ta starts decreasing.

In the case where the during-shifting rotational speed variation control is terminated (time t36), the during-shifting rotational speed variation control section 40 terminates calculation of the rotation-varying torque command value Ta to terminate the during-shifting rotational speed variation control. That is, calculation of the feedforward command value Taff and the feedback command value Tafb is terminated.

In the example of a downshift shown in FIG. 7, in the case where the rotational speed Ni of the rotary electric machine MG has reached the synchronous rotational speed after the shifting (time t36), the speed change mechanism control section 82 makes a transition from the torque control phase to the inertia control phase. Then, the speed change mechanism control section 82 gradually decreases the target transfer torque capacity for the disengagement-side element, and gradually increases the target transfer torque capacity for the engagement-side element (from time t36 to time t37).

In the torque control phase during a downshift, not only the rotational speed relationship but also the torque relationship is transitioned from the state with the shift speed before the shifting to the state with the shift speed after the shifting. Then, in the case where the transition of the torque relationship is terminated (time t37), the speed change mechanism control section 82 increases the target transfer torque capacity for the engagement-side element to the complete engagement capacity to terminate the shift speed switching control.

3-4-1-6. Downshift (Engine Outputs Feedback Command Value)

Next, a comparative example in which a downshift is performed as in FIG. 7 and in which it is assumed that the absolute value of the engine feedforward command value Taffe is decreased in priority to the absolute value of the rotary electric machine feedforward command value Taffm when decreasing the absolute value of the feedforward command value Taff, unlike the embodiment, will be described with reference to FIG. 8.

Figure 8:
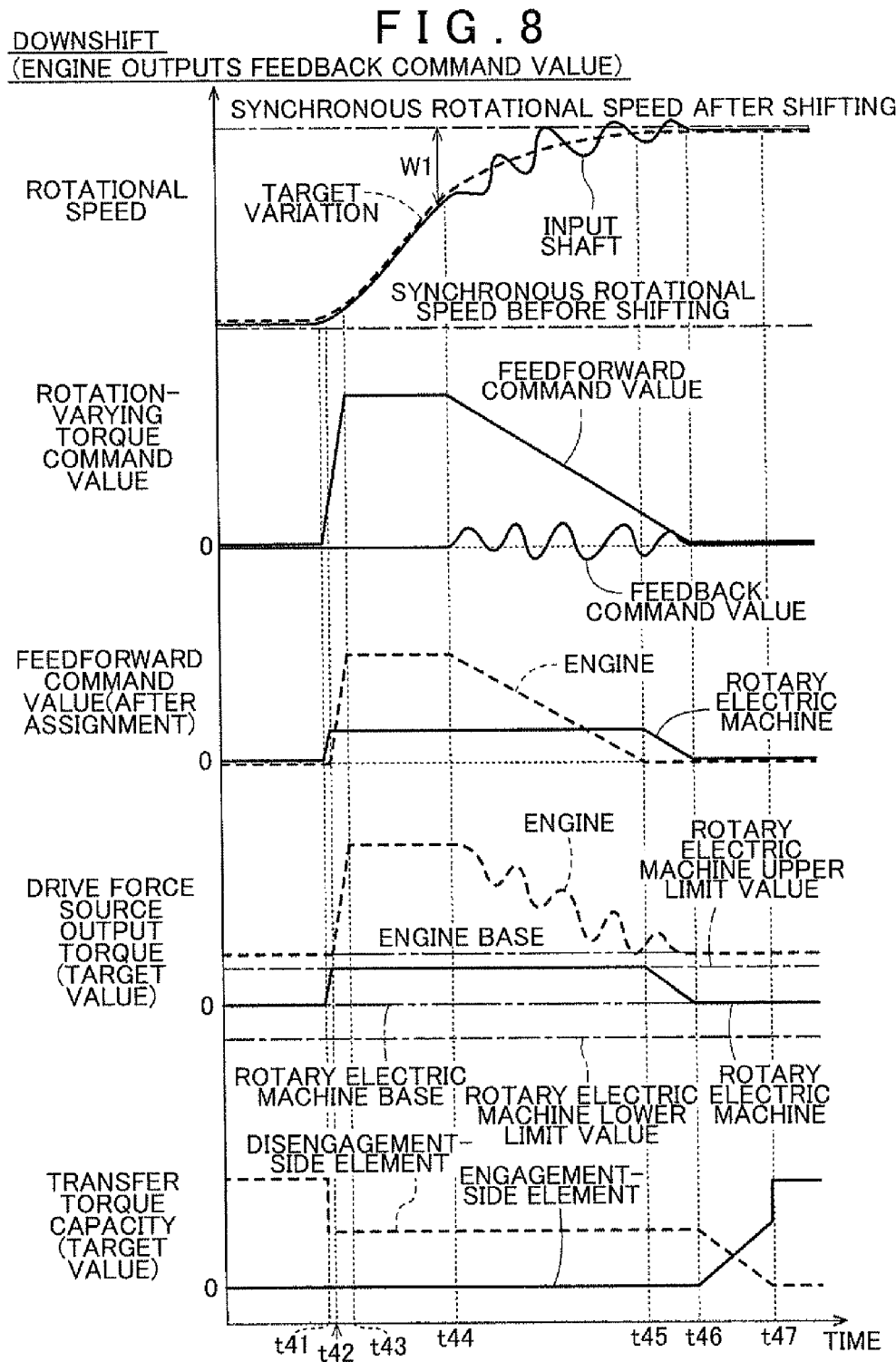
FIG. 8 is a timing chart showing a process performed by a control device that is partially different from that according to the embodiment of the present invention.

As shown in FIG. 8, after the rotation-varying torque command value Ta starts decreasing (at and after time t44), and after the engine feedforward command value Taffe is decreased to zero (at and after t45), the rotary electric machine feedforward command value Taffm is decreased. Accordingly, in the example shown in FIG. 8, unlike the embodiment, the target output torque for the rotary electric machine MG is fixed to the upper limit value that can be output for a relatively long time after the rotation-varying torque command value Ta starts decreasing until the engine feedforward command value Taffe is decreased to zero (from time t44 to time t45). Therefore, the rotary electric machine MG may not be caused to output the feedback command value Tafb as in the comparative example of an upshift shown in FIG. 6. Thus, a torque shock may occur during engagement of the engagement-side element.

In the comparative example shown in FIG. 8, as in the comparative example of an upshift shown in FIG. 6, a feedback command value is calculated for the engine E, unlike the embodiment, during a period for which the target output torque for the rotary electric machine MG is fixed to the upper limit value. Therefore, as shown in the example of FIG. 8, the rotational speed Ni of the input shaft I fluctuates with respect to the target rotational speed variation $\alpha o$, and a torque shock may occur during engagement of the engagement-side element.

3-4-1-7. Flowchart

Figure 9:
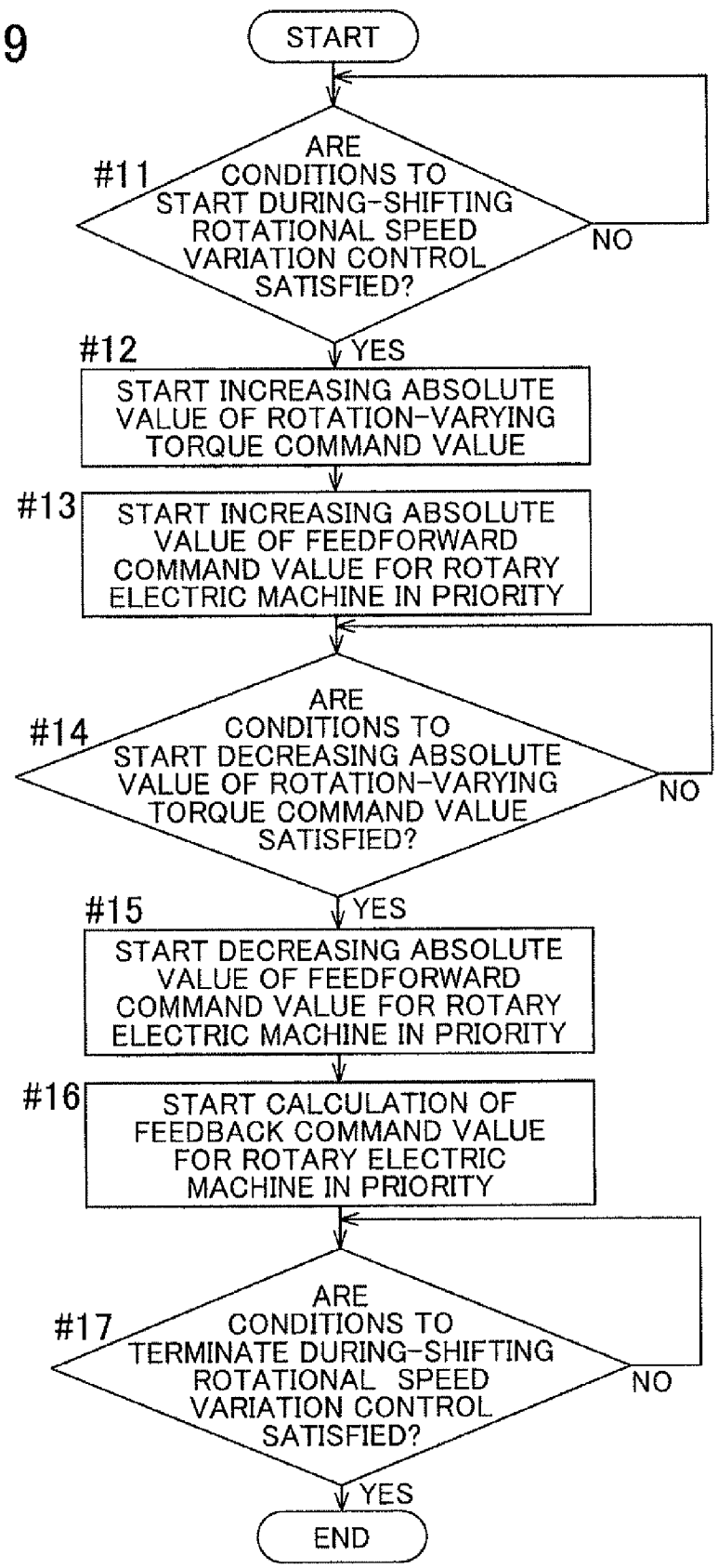
FIG. 9 is a flowchart showing a process performed by the control device according to the embodiment of the present invention.

The processes performed by the during-shifting rotational speed variation control section 40 according to the embodiment will be described with reference to the flowchart of FIG. 9.

First, in the case where conditions to start the during-shifting rotational speed variation control are satisfied (step #11: Yes), the during-shifting rotational speed variation control section 40 starts a sequence of during-shifting rotational speed variation control. The during-shifting rotational speed variation control section 40 determines that the conditions to start the during-shifting rotational speed variation control are satisfied in the case where at least the disengagement-side element is brought from the direct engagement state into the slipping engagement state or the disengaged state after the start of the shift speed switching control. Then, in the case where the during-shifting rotational speed variation control is started, the during-shifting rotational speed variation control section 40 starts increasing the absolute value of the rotation-varying torque command value Ta (step #12). In the embodiment described above, the during-shifting rotational speed variation control section 40 starts increasing the absolute value of the feedforward command value Taff as the rotation-varying torque command value Ta. In this event, the during-shifting rotational speed variation control section 40 starts increasing the absolute value of the rotary electric machine feedforward command value Taffm, within a range in which the absolute value of the output torque of the rotary electric machine MG is equal to or less than a predetermined threshold, in priority to the absolute value of the engine feedforward command value Taffe (step #13).

In the case where conditions to start decreasing the absolute value of the rotation-varying torque command value Ta are satisfied (step #14: Yes), the during-shifting rotational speed variation control section 40 starts decreasing the absolute value of the rotation-varying torque command value Ta. In the embodiment described above, the during-shifting rotational speed variation control section 40 determines that the decrease start conditions are satisfied in the case where the rotational speed difference W1 (absolute value) between the rotational speed Ni of the input shaft I and the synchronous rotational speed after the shifting has decreased to a predetermined value. In the embodiment described above, in addition, the during-shifting rotational speed variation control section 40 starts decreasing the absolute value of the feedforward command value Taff as the rotation-varying torque command value Ta. In this event, the during-shifting rotational speed variation control section 40 starts decreasing the absolute value of the rotary electric machine feedforward command value Taffm in priority to the absolute value of the engine feedforward command value Taffe (step #15). Then, after the absolute value of the rotary electric machine feedforward command value Taffm starts decreasing, the during-shifting rotational speed variation control section 40 starts calculation of the rotary electric machine feedback command value Tafbm, which is a feedback command value for the rotary electric machine MG, in priority to that for the engine E (step #16).

Then, in the case where conditions to terminate the during-shifting rotational speed variation control are satisfied (step #17: Yes), the during-shifting rotational speed variation control section 40 terminates the sequence of during-shifting rotational speed variation control. In the embodiment described above, the during-shifting rotational speed variation control section 40 determines that the conditions to terminate the during-shifting rotational speed variation control are satisfied in the case where the rotational speed Ni of the input shaft I has reached the synchronous rotational speed after the shifting.

Other Embodiments

Lastly, other embodiments of the present invention will be described. The configuration of each embodiment described below is not limited to its independent application, and may be applied in combination with the configuration of other embodiments unless any contradiction occurs.

(1) In the embodiment described above, the control device 30 includes the plurality of control units 32 to 34, and the plurality of control units 32 to 34 include the plurality of functional sections 40 and 81 to 83 in a distributed manner. However, the present invention is not limited thereto. That is, the control device 3 may include the plurality of control units 32 to 34 as control devices integrated or separated in any combination. Also, the plurality of functional sections 40 and 81 to 83 may be distributed in any combination.

(2) In one preferred embodiment of the present invention, in addition to the embodiment described above, a friction engagement element that drivably couples and decouples the rotary electric machine MG and the wheels W to and from each other, or a torque converter and a friction engagement element that brings input and output members of the torque converter into the direct engagement state may be provided separately from the speed change mechanism TM.

(3) In the embodiment described above, the speed change mechanism TM is a stepped automatic transmission.

However, the present invention is not limited thereto. That is, in one preferred embodiment of the present invention, the speed change mechanism TM may be a transmission other than a stepped automatic transmission, such as a continuously variable automatic transmission capable of continuously changing the speed ratio. In this case, changing the speed ratio of the speed change mechanism TM corresponds to switching between shift speeds in the embodiment described above. That is, the during-shifting rotational speed variation control section 40 executes the during-shifting rotational speed variation control when changing the speed ratio of the speed change mechanism TM.

(4) In the embodiment described above, the during-shifting rotational speed variation control section 40 calculates the rotation-varying torque command value Ta on the basis of the target value for the rotational acceleration of the input shaft I in order to vary the rotational speed Ni of the input shaft I. However, the present invention is not limited thereto. That is, the during-shifting rotational speed variation control section 40 may calculate the rotation-varying torque command value Ta on the basis of a target value for the rotational speed of the input shaft I in order to vary the rotational speed Ni of the input shaft I.

In this case, the during-shifting rotational speed variation control section 40 calculates the target value for the rotational speed as the target rotational speed variation αo, and calculates the feedforward command value Taff and the feedback command value Tafb such that the rotational speed Ni of the input shaft I follows the target value for the rotational speed. In this event, the during-shifting rotational speed variation control section 40 may calculate the target value for the rotational speed in accordance with the time having elapsed after the start of the during-shifting rotational speed variation control. For example, the during-shifting rotational speed variation control section 40 calculates the target value for the rotational speed in accordance with the time having elapsed after the start of the during-shifting rotational speed variation control such that the target value for the rotational speed becomes closer from the synchronous rotational speed before the shifting to the synchronous rotational speed after the shifting as the time having elapsed after the start of the during-shifting rotational speed variation control increases, and such that the absolute value of the rate of variations (rotational acceleration) in target value for the rotational speed decreases in the case where the target value for the rotational speed has approximated the synchronous rotational speed after the shifting. In this case, the during-shifting rotational speed variation control section 40 may calculate the feedforward command value Taff by multiplying a time differential value of the calculated target value for the rotational speed by the moment of inertia J. Alternatively, the during-shifting rotational speed variation control section 40 may directly calculate the feedforward command value Taff in accordance with the time having elapsed after the start of the during-shifting rotational speed variation control.

(5) In the embodiment described above, when decreasing the absolute value of the feedforward command value Taff, the during-shifting rotational speed variation control section 40 decreases the absolute value of the engine feedforward command value Taffe after the absolute value of the rotary electric machine feedforward command value Taffm is decreased to zero. However, the present invention is not limited thereto. That is, when decreasing the absolute value of the feedforward command value Taff, the during-shifting rotational speed variation control section 40 may decrease the absolute value of the rotary electric machine feedforward command value Taffm in priority to the absolute value of the engine feedforward command value Taffe. In one preferred embodiment of the present invention, the during-shifting rotational speed variation control section 40 may decrease the engine feedforward command value Taffe after the absolute value of the rotary electric machine feedforward command value Taffm is decreased to a predetermined value (absolute value) that is more than zero, for example.

(6) In the embodiment described above, the during-shifting rotational speed variation control section 40 calculates the rotary electric machine feedback command value Tafbm after the absolute value of the rotary electric machine feedforward command value Taffm is decreased to zero. However, the present invention is not limited thereto. That is, the during-shifting rotational speed variation control section 40 may calculate the rotary electric machine feedback command value Tafbm, which is a feedback command value for the rotary electric machine MG, in priority to that for the engine E after the absolute value of the rotary electric machine feedforward command value Taffm starts decreasing. In one preferred embodiment of the present invention, the during-shifting rotational speed variation control section 40 may calculate the rotary electric machine feedback command value Tafbm after the absolute value of the rotary electric machine feedforward command value Taffm is decreased to a predetermined value (absolute value) that is more than zero, for example.

(7) In the embodiment described above, the during-shifting rotational speed variation control section 40 calculates all the feedforward command value Taff as the engine feedforward command value Taffe after the absolute value of the rotary electric machine feedforward command value Taffm is decreased to zero. However, the present invention is not limited thereto. That is, in one preferred embodiment of the present invention, the during-shifting rotational speed variation control section 40 may calculate all the feedforward command value Taff as the engine feedforward command value Taffe after the absolute value of the rotary electric machine feedforward command value Taffm is decreased to a predetermined value (absolute value) that is more than zero.

(8) In the embodiment described above, the predetermined threshold for the during-shifting rotational speed variation control section 40 is set to the upper limit value (absolute value) or the lower limit value (absolute value) as the maximum value of torque that can be output from the rotary electric machine MG, and the during-shifting rotational speed variation control section 40 does not calculate the rotary electric machine feedback command value Tafbm when the absolute value of the output torque of the rotary electric machine MG is fixed to the maximum value that can be output. However, the present invention is not limited thereto. That is, the predetermined threshold for the during-shifting rotational speed variation control section 40 may be set to a value that is less in magnitude than the upper limit value (absolute value) or the lower limit value (absolute value) as the maximum value that can be output from the rotary electric machine MG, and the during-shifting rotational speed variation control section 40 may calculate the rotary electric machine feedback command value Tafbm even when the absolute value of the output torque of the rotary electric machine MG is fixed to the predetermined threshold. In this case, the rotary electric machine feedback command value Tafbm is calculated such that the output torque of the rotary electric machine becomes equal to or less than the upper limit value (absolute value) or the lower limit value (absolute value) as the maximum value that can be output from the rotary electric machine MG.

(9) In the embodiment described above, in the case where an upshift is executed as switching between shift speeds, the during-shifting rotational speed variation control section 40 starts the during-shifting rotational speed variation control after the disengagement-side element is brought from the direct engagement state into the disengaged state and the engagement-side element is brought from the disengaged state into the slipping engagement state in the torque control phase. However, the present invention is not limited thereto. That is, in the case where an upshift is executed as switching between shift speeds, the during-shifting rotational speed variation control section 40 may start the during-shifting rotational speed variation control at least after the disengagement-side element is brought from the direct engagement state into the slipping engagement state or the disengaged state. Alternatively, the disengagement-side element may be brought from the direct engagement state into the slipping engagement state in the torque control phase.

(10) In the embodiment described above, in the case where a downshift is executed as switching between shift speeds, the during-shifting rotational speed variation control section 40 starts the during-shifting rotational speed variation control after the disengagement-side element is brought from the direct engagement state into the slipping engagement state. However, the present invention is not limited thereto. That is, in the case where a downshift is executed as switching between shift speeds, the during-shifting rotational speed variation control section 40 may start the during-shifting rotational speed variation control after the disengagement-side element is brought from the direct engagement state into the disengaged state or the slipping engagement state and the engagement-side element is brought from the disengaged state into the slipping engagement state.

The present invention may be suitably applied to a control device that controls a vehicle drive device including an input member drivably coupled to a drive force source including a rotary electric machine and an internal combustion engine, an output member drivably coupled to wheels, and a speed change mechanism that transfers rotation of the input member to the output member with the rotational speed changed in accordance with the speed ratio of a shift speed selected from a plurality of shift speeds that can be established switchably.

What is claimed is:

1. A control device that controls a vehicle drive device comprising:
    an input member drivably coupled to a drive force source including a rotary electric machine and an internal combustion engine,
    an output member drivably coupled to wheels, and
    a speed change mechanism that transfers rotation of the input member to the output member with a speed of the rotation changed in accordance with a speed ratio of a shift speed selected from a plurality of shift speeds that is established switchably, wherein
    when switching between the shift speeds, a rotation-varying torque command value, which is a command value for torque that the drive force source is caused to output to vary the rotational speed of the input member, is calculated, the rotary electric machine is caused to output torque in accordance with the rotation-varying torque command value, and in the case where it is determined that an absolute value of the torque that the rotary electric machine is caused to output will become more than a predetermined threshold, both the rotary electric machine and the internal combustion engine are caused to output torque corresponding to the rotation-varying torque command value such that the output torque of the rotary electric machine becomes equal to or less than the predetermined threshold; wherein
    at least a feedback command value that varies the rotation varying command value in a feedback manner such that the rotational speed of the input member follows target rotational speed variation is calculated at the rotation varying torque command value; and
    the feedback command value for the rotary electric machine is calculated in priority to the feedback command value for the internal combustion engine.

2. The control device according to claim 1, wherein:
    a feedforward command value that varies the rotation-varying torque command value in a feedforward manner and a feedback command value that varies the rotation-varying torque command value in a feedback manner such that the rotational speed of the input member follows target rotational speed variation is calculated as the rotation-varying torque command value;
    when decreasing an absolute value of the rotation-varying torque command value, an absolute value of the feedforward command value for the rotary electric machine is decreased in priority to an absolute value of the feedforward command value for the internal combustion engine; and
    the feedback command value for the rotary electric machine is calculated in priority to the feedback command value for the internal combustion engine after the absolute value of the feedforward command value for the rotary electric machine starts decreasing.

3. The control device according to claim 2, wherein
    the feedback command value for the rotary electric machine is calculated in priority to the feedback command value for the internal combustion engine after an absolute value of the feedforward command value for the rotary electric machine is decreased to zero.

4. The control device according to claim 3, wherein
    all the feedforward command value in the rotation-varying torque command value is calculated as the feedforward command value for the internal combustion engine and all the feedback command value in the rotation-varying torque command value is calculated as the feedback command value for the rotary electric machine after an absolute value of the feedforward command value for the rotary electric machine is decreased to zero.

5. The control device according to claim 2, wherein
    all the feedforward command value in the rotation-varying torque command value is calculated as the feedforward command value for the internal combustion engine and all the feedback command value in the rotation-varying torque command value is calculated as the feedback command value for the rotary electric machine after an absolute value of the feedforward command value for the rotary electric machine is decreased to zero.

6. The control device according to claim 1, wherein
    the feedback command value for the rotary electric machine is calculated in priority to the feedback command value for the internal combustion engine after an absolute value of the feedforward command value for the rotary electric machine is decreased to zero.

7. The control device according to claim 6, wherein all the feedforward command value in the rotation-varying torque command value is calculated as the feedforward command value for the internal combustion engine and all the feedback command value in the rotation-varying torque command value is calculated as the feedback command value for the rotary electric machine after an absolute value of the feedforward command value for the rotary electric machine is decreased to zero.

8. The control device according to, claim 1, wherein all the feedforward command value in the rotation-varying torque command value is calculated as the feedforward command value for the internal combustion engine and all the feedback command value in the rotation-varying torque command value is calculated as the feedback command value for the rotary electric machine after an absolute value of the feedforward command value for the rotary electric machine is decreased to zero.

9. The control device according to claim 1, wherein in the case where it is determined that an absolute value of torque that the rotary electric machine is caused to output in accordance with the rotation-varying torque command value will become more than the predetermined threshold, the internal combustion engine is caused to output an amount of torque by which the predetermined threshold is exceeded.

10. A control device that controls a vehicle drive device comprising:
an input member drivably coupled to a drive force source including a rotary electric machine and an internal combustion engine,
an output member drivably coupled to wheels, and
a speed change mechanism that transfers rotation of the input member to the output member with a speed of the rotation changed in accordance with a speed ratio of a shift speed selected from a plurality of shift speeds that is established switchably, wherein
when switching between the shift speeds, a rotation-varying torque command value, which is a command value for torque that the drive force source is caused to output to vary the rotational speed of the input member, is calculated, the rotary electric machine is caused to output torque in accordance with the rotation-varying torque command value, and in the case where it is determined that an absolute value of the torque that the rotary electric machine is caused to output will become more than a predetermined threshold, both the electric machine and the internal combustion engine are caused to output torque corresponding to the rotation-varying torque command value such that the output torque of the rotary electric machine becomes equal to or less than the predetermined threshold; wherein:
a feedforward command value that varies the rotation-varying torque command value in a feedforward manner and a feedback command value that varies the rotation-varying torque command value in a feedback manner such that the rotational speed of the input member follows target rotational speed variation is calculated as the rotation-varying torque command value;
when decreasing an absolute value of the rotation-varying torque command value, an absolute value of the feedforward command value for the rotary electric machine is decreased in priority to an absolute value of the feedforward command value for the internal combustion engine; and
the feedback command value for the rotary electric machine is calculated in priority to the feedback command value for the internal combustion engine after the absolute value of the feedforward command value for the rotary electric machine starts decreasing.

11. The control device according to claim 10, wherein the feedback command value for the rotary electric machine is calculated in priority to the feedback command value for the internal combustion engine after an absolute value of the feedforward command value for the rotary electric machine is decreased to zero.

12. The control device according to claim 10, wherein all the feedforward command value in the rotation-varying torque command value is calculated as the feedforward command value for the internal combustion engine and all the feedback command value in the rotation-varying torque command value is calculated as the feedback command value for the rotary electric machine after an absolute value of the feedforward command value for the rotary electric machine is decreased to zero.

13. A control device that controls a vehicle drive device comprising:
an input member drivably coupled to a drive force source including a rotary electric machine and an internal combustion engine,
an output member drivably coupled to wheels, and
a speed change mechanism that transfers rotation of the input member to the output member with a speed of the rotation changed in accordance with a speed ratio of a shift speed selected from a plurality of shift speeds that is established switchably, wherein
when switching between the shift speeds, a rotation-varying torque command value, which is a command value for torque that the drive force source is caused to output to vary the rotational speed of the input member, is calculated, the rotary electric machine is caused to output torque in accordance with the rotation-varying torque command value, and in the case where it is determined that an absolute value of the torque that the rotary electric machine is caused to output will become more than a predetermined threshold, both the rotary electric machine and the internal combustion engine are caused to output torque corresponding to the rotation-varying torque command value such that the output torque of the rotary electric machine becomes equal to or less than the predetermined threshold; wherein
at least a feedforward command value that varies the rotation-varying torque command value in a feedforward manner is calculated as the rotation-varying torque command value; and
an absolute value of the feedforward command value for the rotary electric machine is increased, within a range in which the output torque of the rotary electric machine is equal to or less than the predetermined threshold, in priority to an absolute value of the feedforward command value for the internal combustion engine before an absolute value of the rotation-varying torque command value starts decreasing.

* * * * *